(12) United States Patent
Liang et al.

(10) Patent No.: US 11,988,501 B2
(45) Date of Patent: May 21, 2024

(54) METHOD AND A SYSTEM FOR REAL-TIME HIGH-SPEED THREE DIMENSIONAL SURFACE IMAGING

(71) Applicant: INSTITUT NATIONAL DE LA RECHERCHE SCIENTIFIQUE, Québec (CA)

(72) Inventors: Jinyang Liang, Boucherville (CA); Cheng Jiang, Longueuil (CA); Patrick Kilcullen, Montréal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 183 days.

(21) Appl. No.: 17/310,489

(22) PCT Filed: Feb. 6, 2020

(86) PCT No.: PCT/CA2020/050149
§ 371 (c)(1),
(2) Date: Aug. 5, 2021

(87) PCT Pub. No.: WO2020/160666
PCT Pub. Date: Aug. 13, 2020

(65) Prior Publication Data
US 2022/0357151 A1 Nov. 10, 2022

Related U.S. Application Data

(60) Provisional application No. 62/902,445, filed on Sep. 19, 2019, provisional application No. 62/801,707, filed on Feb. 6, 2019.

(51) Int. Cl.
*G01B 11/25* (2006.01)

(52) U.S. Cl.
CPC ...... *G01B 11/2527* (2013.01); *G01B 11/2504* (2013.01)

(58) Field of Classification Search
CPC . G01B 11/25–11/2545; G01B 11/2527; G01B 11/2504; G06T 7/521
See application file for complete search history.

(56) References Cited

U.S. PATENT DOCUMENTS

| 4,294,544 A | * | 10/1981 | Altschuler | ......... | G01B 11/2513 |
|---|---|---|---|---|---|
| | | | | | 356/520 |
| 2005/0219552 A1 | * | 10/2005 | Ackerman | ......... | G01B 11/2536 |
| | | | | | 356/603 |

(Continued)

OTHER PUBLICATIONS

PCTCA2020050149-ib311-000001-EN, Notification concerning availability of the publication of the international application, Aug. 13, 2020.

(Continued)

*Primary Examiner* — Michael P LaPage
(74) *Attorney, Agent, or Firm* — LAVERY, DE BILLY, LLP; Gwendoline Bruneau

(57) ABSTRACT

A method for 3D surface imaging of an object, comprising generating a sinusoidal pattern from an input beam; projecting the sinusoidal pattern onto the object; acquiring deformed structured images from the object; reconstructing and displaying the surface of the object in real-time. A system comprises an device encoding an input beam with a structured pattern; a filter configured to spatially filter the encoded beam; a projector lens projecting the structured pattern onto the object; a high speed camera acquiring a structured pattern deformed by the 3D surface of the object; a graphic processing unit; and a CoaXPress interface transferring data acquired by the camera to the graphic processing unit; the graphic processing unit reconstructing and displaying the 3D surface of the object in real-time.

17 Claims, 16 Drawing Sheets

(56) References Cited

U.S. PATENT DOCUMENTS

| | | | | |
|---|---|---|---|---|
| 2014/0064603 | A1* | 3/2014 | Zhang | G01B 11/2513 |
| | | | | 382/154 |
| 2015/0077535 | A1* | 3/2015 | Izatt | G02B 5/18 |
| | | | | 348/79 |
| 2018/0227571 | A1* | 8/2018 | Page | H04N 23/71 |
| 2018/0262684 | A1* | 9/2018 | Lowry | H04N 7/0122 |
| 2019/0261843 | A1* | 8/2019 | Guan | A61B 1/00172 |
| 2020/0278250 | A1* | 9/2020 | Scarcelli | G01J 3/4406 |
| 2020/0342205 | A1* | 10/2020 | Park | G01N 21/6458 |

OTHER PUBLICATIONS

Jean-Yves Bouguet, Camera Calibration Toolbox for Matlab, Last updated Oct. 14, 2015.

M. Akutsu, Y. Oikawa, and Y. Yamasaki, "Extract voice information using high-speed camera," in Proceedings of Meetings on Acoustics ICA2013, (ASA, 2013), 055019.

S. Alben and M. J. Shelley, "Flapping states of a flag in an inviscid fluid: bistability and the transition to chaos," Physical review letters 100, 074301 (2008).

M. Argentina and L. Mahadevan, "Fluid-flow-induced flutter of a flag," Proceedings of the National Academy of Sciences 102, 1829-1834 (2005).

S. Banerjee, B. S. Connell, and D. K. Yue, "Three-dimensional effects on flag flapping dynamics," Journal of Fluid Mechanics 783, 103-136 (2015).

J.-A. Beraldin, F. Blais, P. Boulanger, L. Cournoyer, J. Domey, S. El-Hakim, G. Godin, M. Rioux, and J. Taylor, "Real world modelling through high resolution digital 3D imaging of objects and structures," ISPRS Journal of Photogrammetry and Remote Sensing 55, 230-250 (2000).

A. Chatterjee, P. Singh, V. Bhatia, and S. Prakash, "Ear biometrics recognition using laser biospeckled fringe projection profilometry," Optics & Laser Technology 112, 368-378 (2019).

K. L. Chung, S. C. Pei, Y. L. Pan, W. L. Hsu, Y. H. Huang, W. N. Yang, and C. H. Chen, "A gradient-based adaptive error diffusion method with edge enhancement," Expert Systems with Applications 38, 1591-1601 (2011).

B. S. Connell and D. K. Yue, "Flapping dynamics of a flag in a uniform stream," Journal of fluid mechanics 581, 33-67 (2007).

P W WFuller, An introduction to high speed photography and photonics, The imaging Science Journal, vol. 57, 2009.

J. Geng, "Structured-light 3D surface imaging: a tutorial," Adv. Opt. Photon. 3, 128-160 (2011).

D. C. Ghiglia and L. A. Romero, "Robust two-dimensional weighted and unweighted phase unwrapping that uses fast transforms and iterative methods," JOSA A 11, 107-117 (1994).

S. S. Gorthi and P. Rastogi, "Fringe projection techniques: whither we are?," Optics and lasers in engineering 48, 133-140 (2010).

M. Gosta and M. Grgic, "Accomplishments and challenges of computer stereo vision," in Proceedings ELMAR-2010, (IEEE, 2010), 57-64.

T. D. Han and T. S. Abdelrahman, "hiCUDA: High-level GPGPU programming," IEEE Transactions on Parallel and Distributed systems 22, 78-90 (2011).

M. Hansard, S. Lee, O. Choi, and R. P. Horaud, Time-of-flight cameras: principles, methods and applications (Springer Science & Business Media, 2012).

L. J. Hornbeck, "Digital light processing for high-brightness high-resolution applications," in Projection Displays III, (International Society for Optics and Photonics, 1997), 27-41.

W.-X. Huang and H. J. Sung, "Three-dimensional simulation of a flapping flag in a uniform flow," Journal of Fluid Mechanics 653, 301-336 (2010).

J.-S. Hyun and S. Zhang, "Enhanced two-frequency phase-shifting method," Applied optics 55, 4395-4401 (2016).

J.-S. Hyun, B. Li, and S. Zhang, "High-speed high-accuracy three-dimensional shape measurement using digital binary defocusing method versus sinusoidal method," Optical Engineering 56, 074102 (2017).

Lazaros, et al., Review of Stereo Vision Algorithms: From Software to Hardware, Int. J. Optomechatronics, 2(4), 435-462, 2008.

S. Lei and S. Zhang, "Flexible 3-D shape measurement using projector defocusing," Optics letters 34, 3080-3082 (2009).

B. Li, Y. Wang, J. Dai, W. Lohry, and S. Zhang, "Some recent advances on superfast 3D shape measurement with digital binary defocusing techniques," Optics and Lasers in Engineering 54, 236-246 (2014).

B. Li and S. Zhang, "Superfast high-resolution absolute 3D recovery of a stabilized flapping flight process," Optics express 25, 27270-27282 (2017).

B. Li and S. Zhang, "Novel method for measuring a dense 3d strain map of robotic flapping wings," Measurement Science and Technology 29, 045402 (2018).

J. Liang, R. N. Kohn Jr, M. F. Becker, and D. J. Heinzen, "High-precision laser beam shaping using a binary-amplitude spatial light modulator," Appl. Opt. 49, 1323-1330 (2010).

Liang, et al., Grayscale laser image formation using a programmable binary mask, Opt. Eng., 51(10), 108201, 2012.

A. Manela and M. Howe, "On the stability and sound of an unforced flag," Journal of Sound and Vibration 321, 994-1006 (2009).

S. Michelin, S. G. L. Smith, and B. J. Glover, "Vortex shedding model of a flapping flag," Journal of Fluid Mechanics 617, 1-10 (2008).

https://developer.nvidia.com/cufft.—2023.

Salvi, et al., A State of the Art in Structured ILght Patterns for Surface Profilmetry, Pattern recognition, 43(8), 2666-2680, 2010.

S. Seer, N. Brändle, and C. Ratti, "Kinects and human kinetics: A new approach for studying pedestrian behavior," Transportation Research Part C 48, 212-228 (2014). 5. M. Gosta an.

M. Shelley, N. Vandenberghe, and J. Zhang, "Heavy flags undergo spontaneous oscillations in flowing water," Physical review letters 94, 094302 (2005).

M. J. Shelley and J. Zhang, "Flapping and bending bodies interacting with fluid flows," Annual Review of Fluid Mechanics 43, 449-465 (2010).

Z. Song, Handbook of 3D machine vision : optical metrology and imaging , vol. Chapter 9, (2013).

J. Stegmaier, F. Amat, W. C. Lemon, K. McDole, Y. Wan, G. Teodoro, R. Mikut, and P. J. Keller, "Real-time three-dimensional cell segmentation in large-scale microscopy data of developing embryos," Developmental cell 36, 225-240 (2016).

X. Su and Q. Zhang, "Dynamic 3-D shape measurement method: a review," Optics and Lasers in Engineering 48, 191-204 (2010).

G. W. Taylor, J. R. Burns, S. Kammann, W. B. Powers, and T. R. Welsh, "The energy harvesting eel: a small subsurface ocean/river power generator," IEEE journal of oceanic engineering 26, 539-547 (2001).

S. Van der Jeught and J. J. Dirckx, "Real-time structured light profilometry: a review," Optics and Lasers in Engineering 87, 18-31 (2016).

M. Vázquez-Arellano, H. Griepentrog, D. Reiser, and D. Paraforos, "3-D imaging systems for agricultural applications-a review," Sensors 16, 618 (2016).

D. Waide, "The Future of Machine Vision Standards," Quality, 19VS (2017).

Y. Wang and S. Zhang, "Three-dimensional shape measurement with binary dithered patterns," Applied optics 51, 6631-6636 (2012).

Y. Wang, J. I. Laughner, I. R. Efimov, and S. Zhang, "3D absolute shape measurement of live rabbit hearts with a superfast two-frequency phase-shifting technique," Optics express 21, 5822-5832 (2013).

Y. Watanabe, K. Isogai, S. Suzuki, and M. Sugihara, "A theoretical study of paper flutter," Journal of Fluids and Structures 16, 543-560 (2002).

J. Zhang, S. Childress, A. Libchaber, and M. Shelley, "Flexible filaments in a flowing soap film as a model for one-dimensional flags in a two-dimensional wind," Nature 408, 835 (2000).

S.Zhang, Novel method for structured light system calibration, Optical Engineering 45(8), 083601, Aug. 2006.

S. Zhang, "Recent progresses on real-time 3D shape measurement using digital fringe projection techniques," Optics and lasers in engineering 48, 149-158 (2010).

(56) References Cited

OTHER PUBLICATIONS

S. Zhang, "Absolute phase retrieval methods for digital fringe projection profilometry: A review," Optics and Lasers in Engineering 107, 28-37 (2018).
Zhang, High-speed 3D shape measurement with structured light methods: A review, Opt. Laser En., 106, 119-131, 2018.
K. Zhong, Z. Li, X. Zhou, Y. Li, Y. Shi, and C. Wang, "Enhanced phase measurement profilometry for industrial 3D inspection automation," The International Journal of Advanced Manufacturing Technology 76, 1563-1574 (2015).
C. Zuo, S. Feng, L. Huang, T. Tao, W. Yin, and Q. Chen, "Phase shifting algorithms for fringe projection profilometry: A review," Optics and Lasers in Engineering 109, 23-59 (2018).
C. Zuo, T. Tao, S. Feng, L. Huang, A. Asundi, and Q. Chen, "Micro Fourier Transform Profilometry (µFTP): 3D shape measurement at 10,000 frames per second," Optics and Lasers in Engineering 102, 70-91 (2018).

* cited by examiner

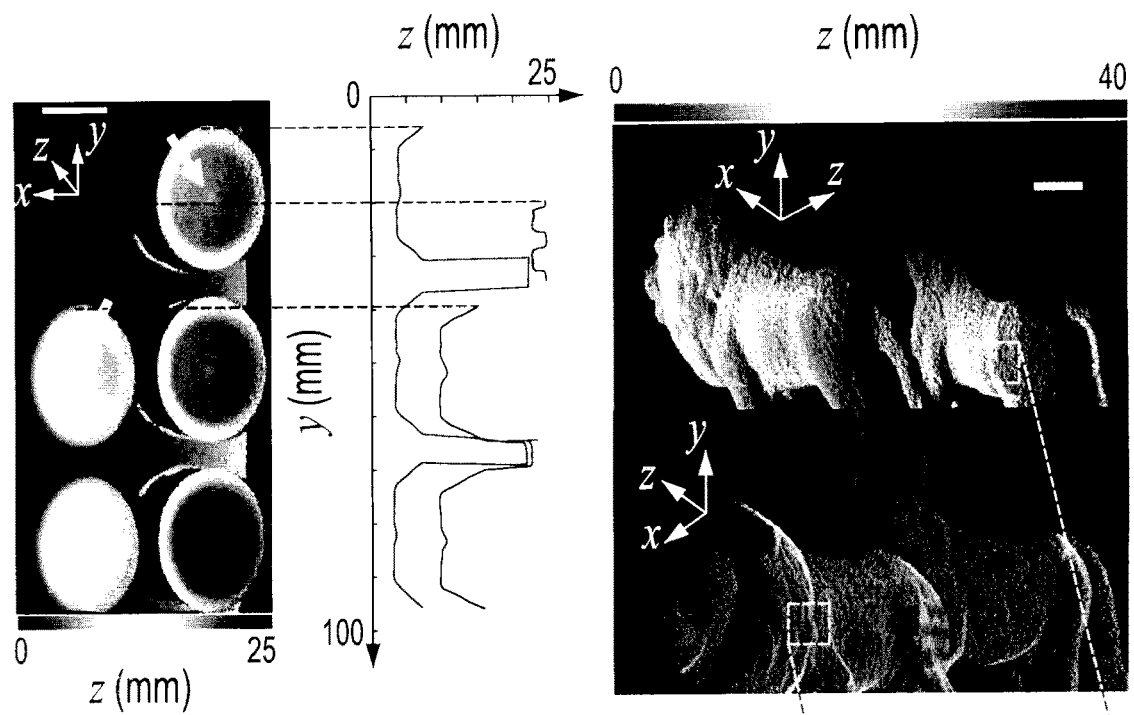
FIG. 6a
FIG. 6c
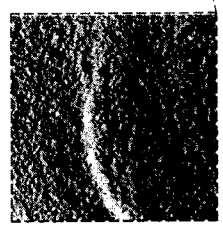
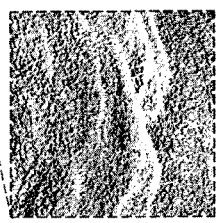
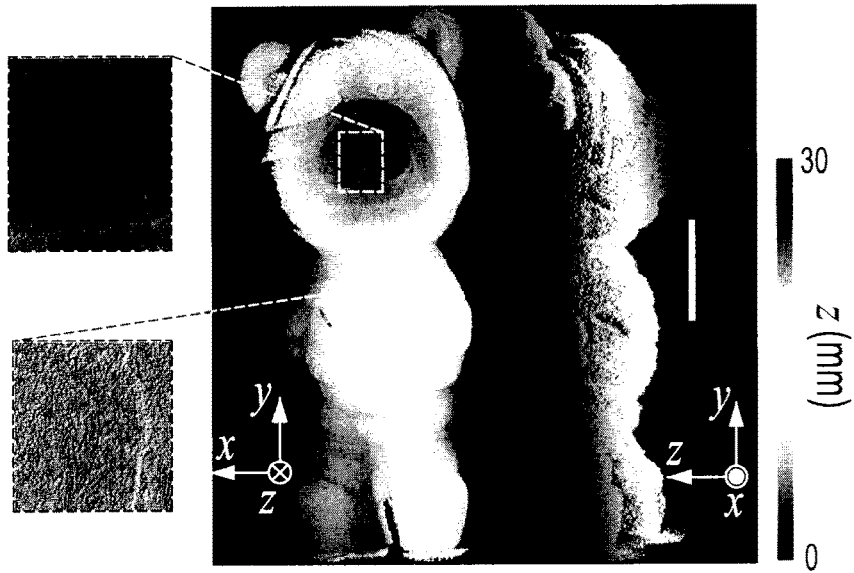
FIG. 6b

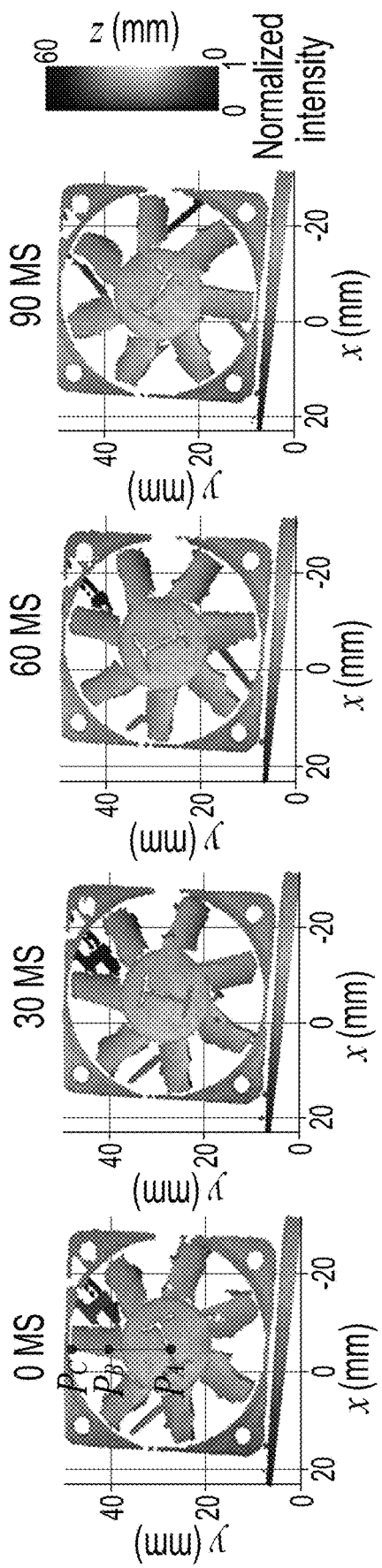
FIG - 7a
FIG - 7b
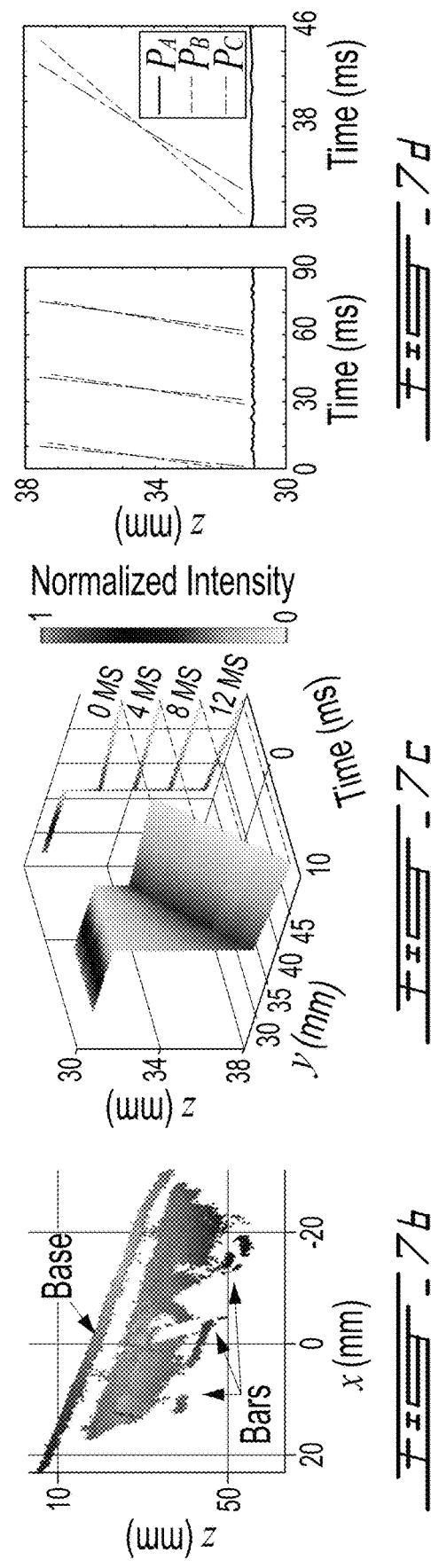
FIG - 7c
FIG - 7d

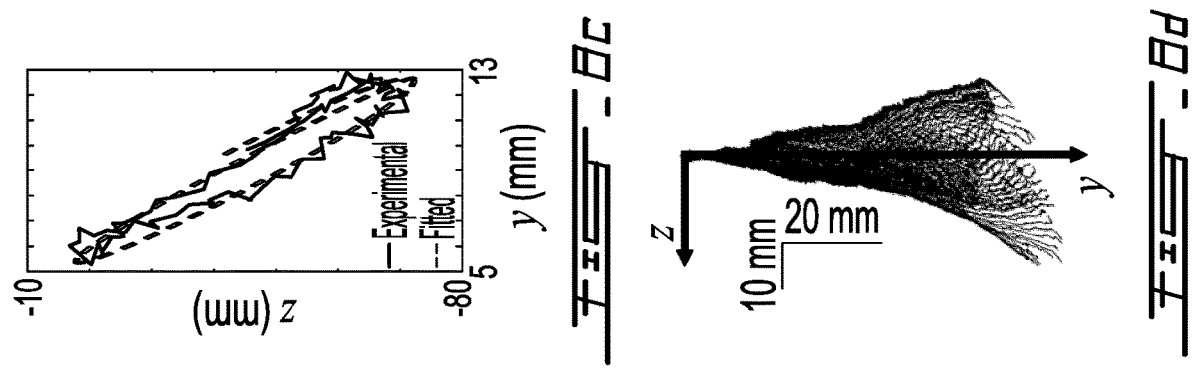
FIG. 8c
FIG. 8d
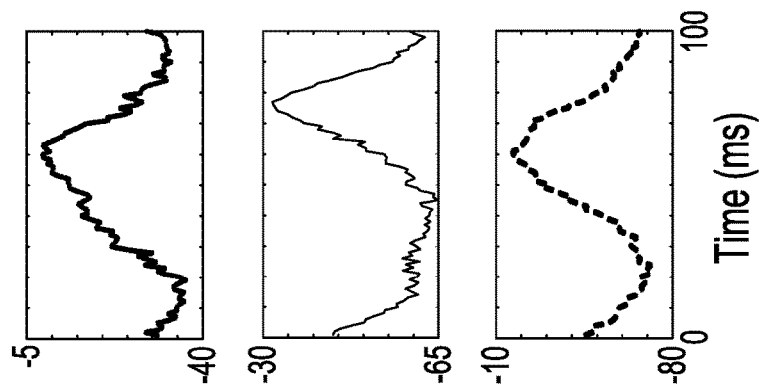
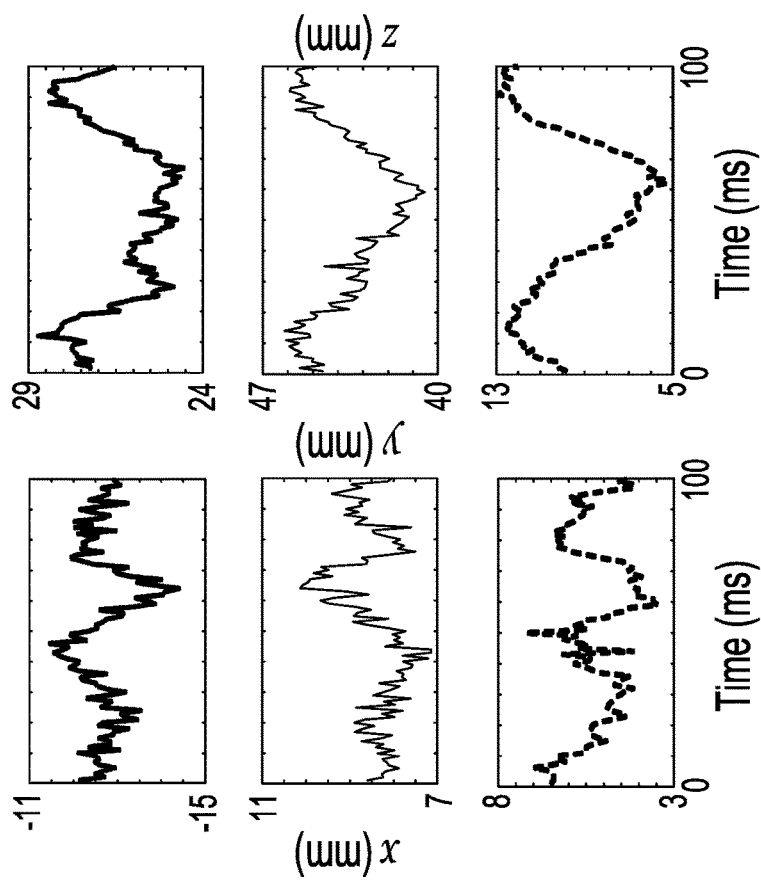
FIG. 8b

METHOD AND A SYSTEM FOR REAL-TIME HIGH-SPEED THREE DIMENSIONAL SURFACE IMAGING

CROSS-REFERENCE TO RELATED APPLICATIONS

This application is a National Entry Application of PCT application no. CA2020/050149 filed on Feb. 6, 2020 and published in English under PCT Article 21(2), which itself claims benefit of U.S. provisional application Ser. No. 62/801,707, filed on Feb. 6, 2019. All documents above are incorporated herein in their entirety by reference.

FIELD OF THE INVENTION

The present disclosure relates to 3D imaging. More specifically, the present disclosure is concerned with a method and a system for real-time high-speed three-dimensional surface imaging.

BACKGROUND OF THE INVENTION

Three-dimensional (3D) surface imaging is used in a range of fields, including machine vision [1], remote sensing [2], biomedical engineering [3], and entertainment [4]. Demands for higher spatial resolution, a larger field of view (FOV), and a higher imaging speed have generated a number of 3D surface imaging methods [5-7].

Among them, structured-light profilometry (SLP) has become the mainstream technique [8]. In a typical setup, a projector delivers structured patterns onto an object. The structured patterns, deformed by the 3D surface of the object, are captured by a camera. The 3D information of the object is then extracted by analyzing the deformation of the patterns with respect to reference phase profiles. Among existing choices of structured patterns in structured-light profilometry (SLP) [9], grayscale sinusoidal fringes are most widely used because they provide 3D data with both high spatial resolution and high depth accuracy [10] as well as their suitability for high-speed 3D measurements [11]. Digital micromirror devices (DMDs) are commonly used to generate sinusoidal fringes. Each micromirror on a DMD can be independently tilted to either +12° or −12° from its surface normal to generate binary patterns at up to tens of kilohertz (kHz). By controlling the overall reflectance via temporal dithering, the DMD can produce grayscale sinusoidal patterns [12]. The DMD-based structured-light profilometry (SLP) is flexible in system development and accurate in 3D measurements [13-16].

Development of DMD-based SLP has allowed high-speed 3D surface imaging in real time, defined as image acquisition, processing, and display during the occurrence of dynamic events [17]. Nonetheless, most existing systems still have limitation in terms of fringe pattern generation, image acquisition and processing. Micromirror-dithering clamps the speed of generating 8-bit grayscale images to around 100 Hz [18], which excludes 3D profilometry of a range of moving objects, such as beating hearts and vibrating membranes [19, 20]. This limitation can be mitigated by using binary defocusing [21-23], which generates a pseudo-sinusoidal pattern at an unconjugated plane to the DMDs by slightly defocusing the projector. However, this method compromises the depth sensing range [24] and is less flexible when used with binary patterns with different periods. Meanwhile, the uneven surface of the DMDs [25] may induce image distortion to the defocused sinusoidal patterns at the unconjugated plane, which may decrease measurement accuracy especially under coherent illumination.

Image acquisition devices and image processing modules in existing SLP systems also have limitations. Most high-speed cameras deployed in SLP, despite having ultra-high imaging speeds, are not equipped with a high-speed interface to transfer data on time. This bottleneck also hampers the on-line processing software developed based on graphics processing units (GPUs) [26]. As a result, these systems cannot continuously stream data, further limiting their application scope to highly synchronous events.

There is still a need in the art for a method and a system for real-time high-speed three-dimensional surface imaging.

SUMMARY OF THE INVENTION

More specifically, in accordance with the present invention, there is provided a method for 3D surface imaging of an object, comprising generating a sinusoidal pattern from an input beam; projecting the sinusoidal pattern onto the object; acquiring deformed structured images from the object; reconstructing and displaying the surface of the object in real-time.

There is further provided a system for real-time high-speed 3D surface imaging of an object, comprising an device encoding an input beam with a structured pattern; a filter configured to spatially filter the encoded beam; a projector lens projecting the structured pattern onto the object; a high speed camera acquiring a structured pattern deformed by the 3D surface of the object; a graphic processing unit; and a CoaXPress interface transferring data acquired by the camera to the graphic processing unit; the graphic processing unit reconstructing and displaying the 3D surface of the object in real-time.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 6A shows reconstructed image of interlocking brick toys (left) and depth profiles of selected centerlines (right) using the system of FIG. 4A;

FIG. 6B shows reconstruction results of a bear toy with different perspective angles and close-up views, scalar bar: 10 mm, using the system of FIG. 4A;

FIG. 6C shows reconstruction results of a lion toy and a horse toy with different perspective angles and close-up views, scalar bar: 10 mm, using the system of FIG. 4A;

FIG. 7A shows a front view of reconstructed 3D images at 0 ms, 30 ms, 60 ms and 90 ms of a rotating fan, using the system of FIG. 4A;

FIG. 7B shows a side view of the reconstructed 3D image of FIG. 7A at 60 ms;

FIG. 7C shows depth line profiles along a radial direction over time;

FIG. 7D shows depth dynamics of selected points, in the range [30; 90] ms (left hand-side) and an enlarged view in the range [30-46] (right hand-side);

FIG. 8B shows evolution of 3D positions of selected points of the flapping flag;

FIG. 8C shows phase relation of the y-z positions of the selected point $p_C$ and the fitted result;

FIG. 8D shows superimposed centerlines of the flag over time; the pole being defined to zero in the z axis;

FIG. 13D is a camera image with selected grids;

FIG. 13E is a projector image with the corresponding grids;

DESCRIPTION OF ILLUSTRATIVE EMBODIMENTS

The present invention is illustrated in further details by the following non-limiting examples.

Figure 1:
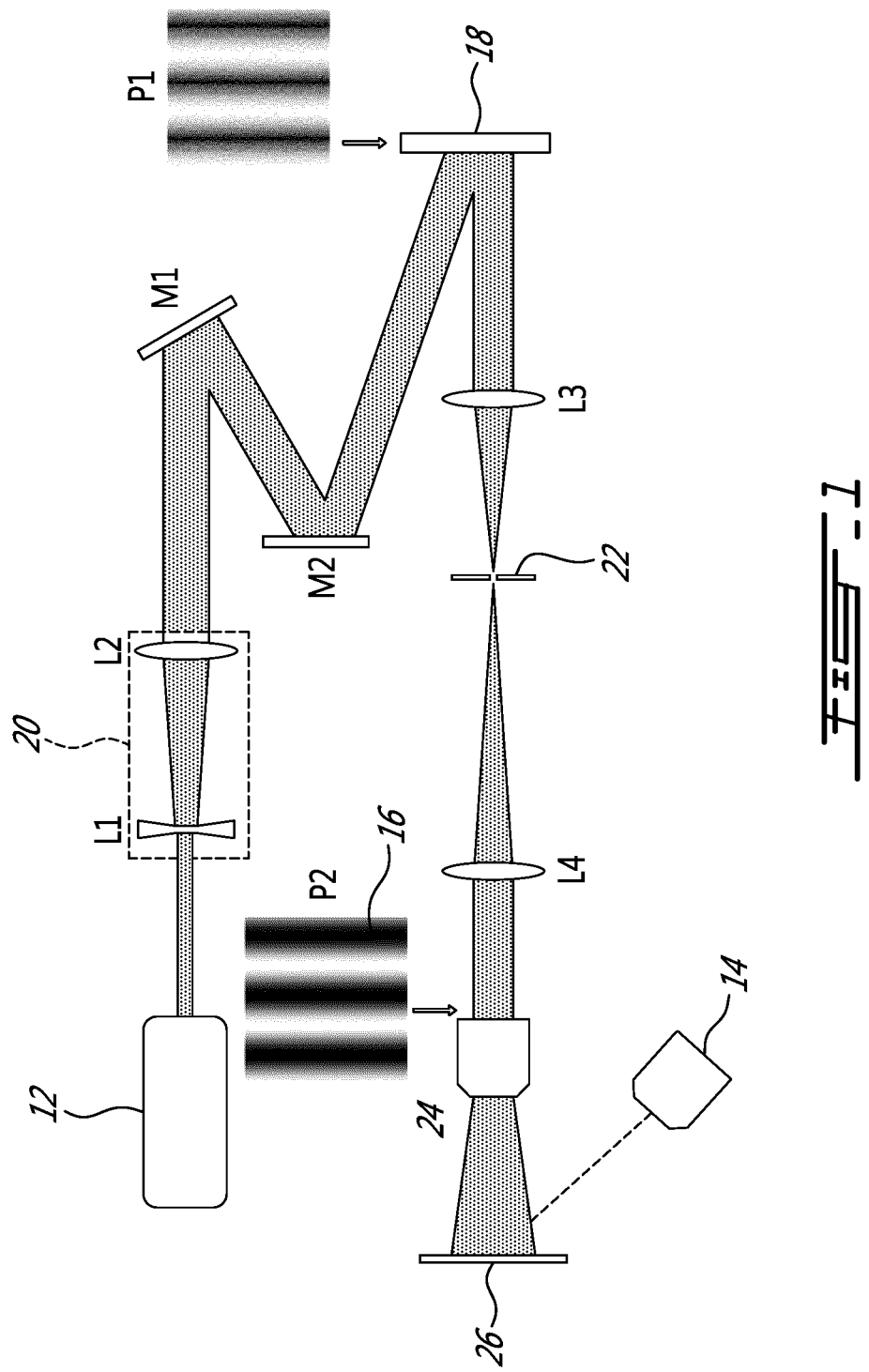
FIG. 1 is a schematic view of a bandwidth-limited 3D profilometry system according to an embodiment of an aspect of the present disclosure.

In a system as illustrated in FIG. 1, a beam expander 20 is used to expand a laser beam 12 to fully cover the active area of an encoding device 18, so that the laser beam can make full use of the completely active area of the encoding device 18. Mirrors M1, M2 direct the extended laser beam to the encoding device 18 with a specific angle. After encoding by the encoding device 18, the beam profile is spatially filtered in a 4f system (lenses L3, L4) and a pinhole 22 positioned at the Fourier plane. A projector lens 24 at the image plane of the 4f system projects the pattern onto the object 26. A high-speed camera 14 is used in conjunction with a frame grabber (not shown) for acquiring the structured patterns deformed by the 3D surface of the object 26.

The illumination source is a continuous-wave laser 12 with an output power of at least 200 mW, and a wavelength selected according to the camera's response, in a range between 420 and 700 nm. The beam expander 20 has a magnification time of more than 8, a maximum input beam diameter of more than 1.2 mm, and a wavelength range selected to cover the illumination wavelength. The mirrors M1 and M2, with a diameter of at least 2", have a wavelength range selected to cover the illumination wavelength.

The encoding device 18 is a spatial light modulator such as a digital micromirror device (DMD), with a resolution of more than 1 Mega pixels and a full frame refreshing rate: of at least 5 kHz.

The two double-convex lens L3, L4, of a diameter of at least 2" and focal length between 100 and 200 mm, have a wavelength range selected to cover the illumination wavelength. Optical low-pass filtering is achieved by a pinhole 22 of a diameter higher than 125 µm.

The projector lens 24 has focal length between 18 and 55 mm, and a maximum aperture of f/3.5-5.6. The high-speed camera 14 has a frame rate of at least 5 k frames/second, and more than 250 k pixels on the sensor.

Figure 2:
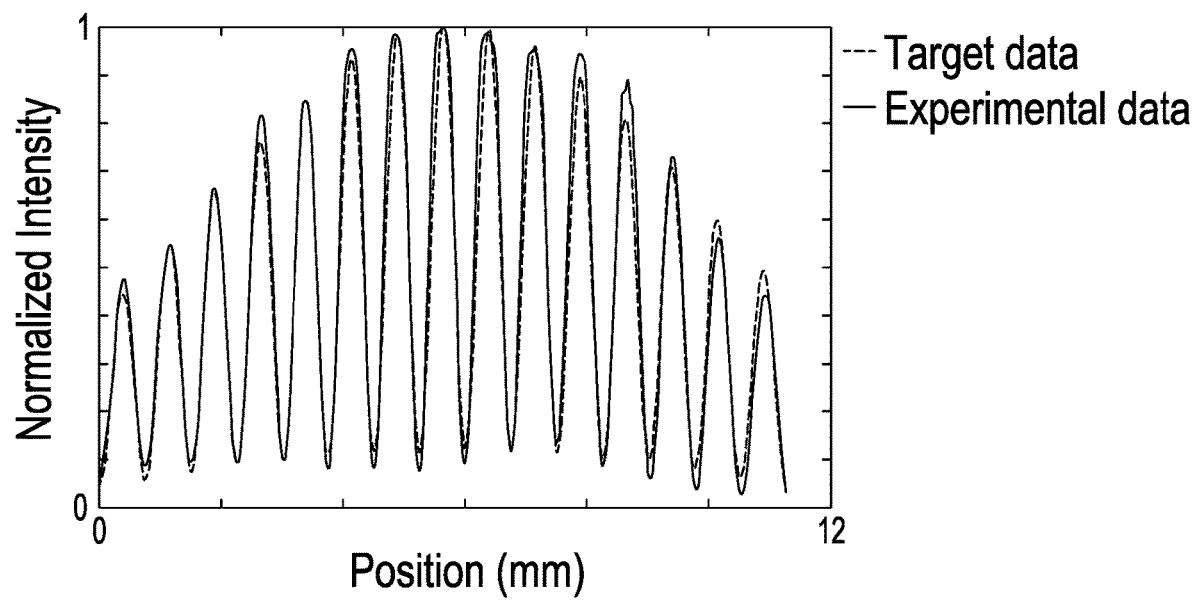
FIG. 2 shows experimental results of a beam profiler test of the system of FIG. 1.

A beam profiler 16 at the image plane of the 4f system is used to test the projected pattern P1. From experimental data, curve-fitting tools ae used to compare the projected binary pattern P1 and a target profile P2 defined as a sinusoidal intensity constrained by a Gaussian envelope (Gaussian function×sine function). The fitting results are as shown in FIG. 2.

After testing the projected pattern P1, the system and method were applied to a 3D reconstruction experiment with static target objects. The camera resolution was set to be 1280×860 pixels. The four-step phase shift method was used to extract the phase value (λ=80 pixels). 3D point cloud reconstruction of static toy animals in FIG. 3 shows high quality of detailed information recovery.

The system and method is thus shown to allow grayscale sinusoidal pattern formation from a single static programmed binary pattern by a high-precision laser beam shaping system based on a DMD. An error diffusion algorithm may be applied in the binary pattern generation. The method may be used to project sinusoidal patterns on the image plane without mirror dithering.

The bandwidth limited projection is used in structural illumination. It enables sinusoidal pattern generation using a single binary pattern loaded onto the DMD. In addition, the sinusoidal pattern is formed at a fixed image plane, regardless of the spatial period of the sinusoidal patterns. In this regard, the present method solves previous problems in binary defocusing method. In addition, by leveraging the high refreshing rate of the DMD, the present method has the ability to project sinusoidal patterns at a speed of several thousand frames per second, which enables kilohertz-level 3D profilometry.

Figure 3:
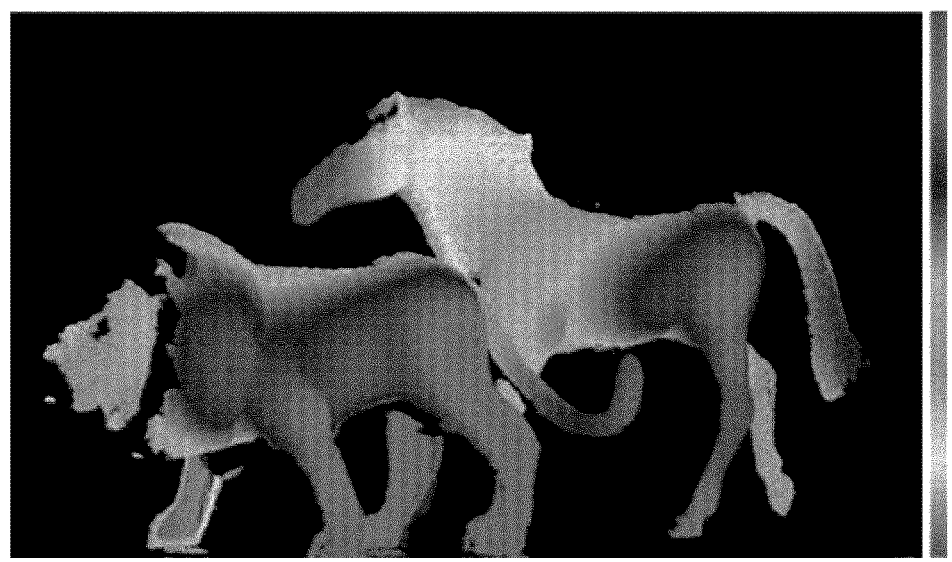
FIG. 3 shows an example of reconstruction results of static objects using the system of FIG. 1.

The present system and method of FIGS. 1-3 provide a fast 3D profilometer. In addition, such system and method have applications in super-resolution microscopy. Moreover, they may provide a cost-effective alternative in the field of passive ultra-high-speed imaging.

Figure 4A:
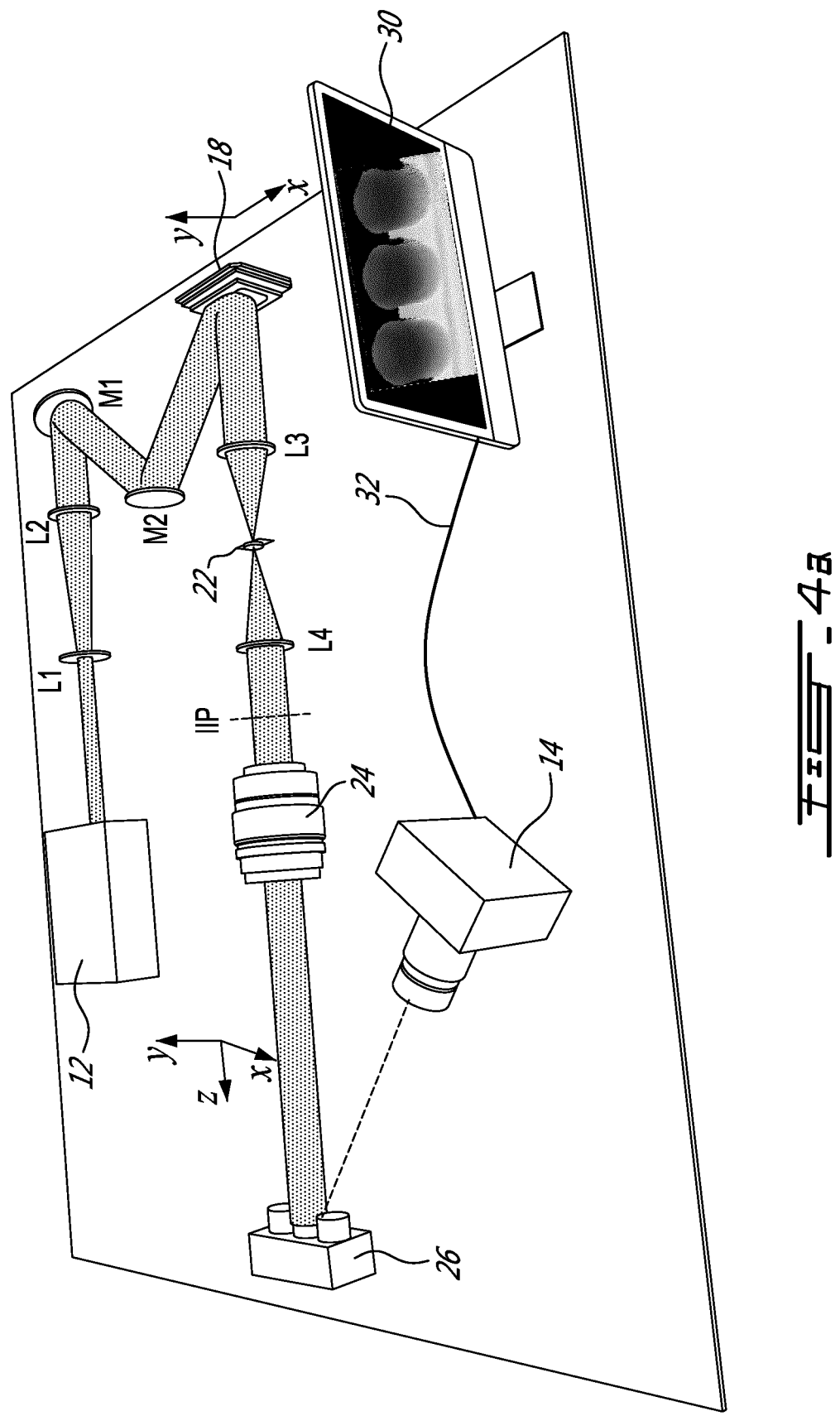
FIG. 4A is a schematic view of a system according to an embodiment of an aspect of the present disclosure.

In a system according to another embodiment of an aspect of the present disclosure illustrated in FIG. 4A for example, a continuous-wave laser (671-nm wavelength and 200-mW power, such as MRL-III-671, CNI Lasers for example) is used as the light source 12. After expansion and collimation by lenses L1 and L2, the laser beam is directed to a 0.45" DMD 18 at an incident angle of about 24° with respect of its surface normal. Binary patterns loaded onto the DMD 18 generate sinusoidal fringes at the intermediate image plane (IIP) by the band-limited 4f imaging system (lenses L3 and L4; pinhole 22).

The projector lens 24 projects these fringes onto the 3D object 26 with a field of view (FOV) of 100 mm×100 mm. The deformed structured images scattered from the object 26 are captured by a high-speed CMOS camera 14 at 5 kHz with 512×512 pixels in each frame. The captured images are transferred to a host computer 30 with via a CoaXPress interface 32 connected to a frame grabber (such as Cyton-CXP, Bitflow for example). A GPU-based image processing software is used for 3D image reconstruction in real-time.

The CoaXPress interface 32, with a data transfer speed of at least 25 Gbps for example, is used for high-speed data acquisition. The GPU, with a memory speed of a least 8 Gbps, memory bandwidth of a least 192 GB/sec, NVIDIA CUDA® Cores of a least 1152 for example, allows real-time data processing.

Figure 4C:
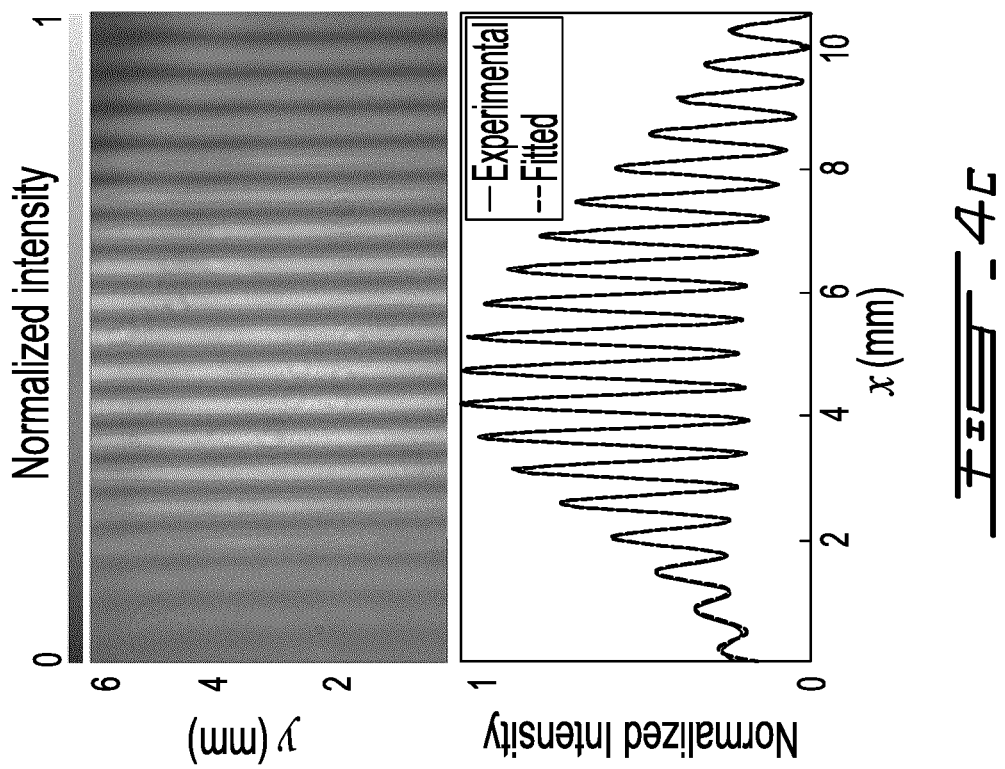
FIG. 4C shows a grayscale sinusoidal pattern generated experimentally by band-limited illumination (top panel), and comparison of the averaged cross section of the pattern with a fitted result (bottom panel)
Figure 4B:
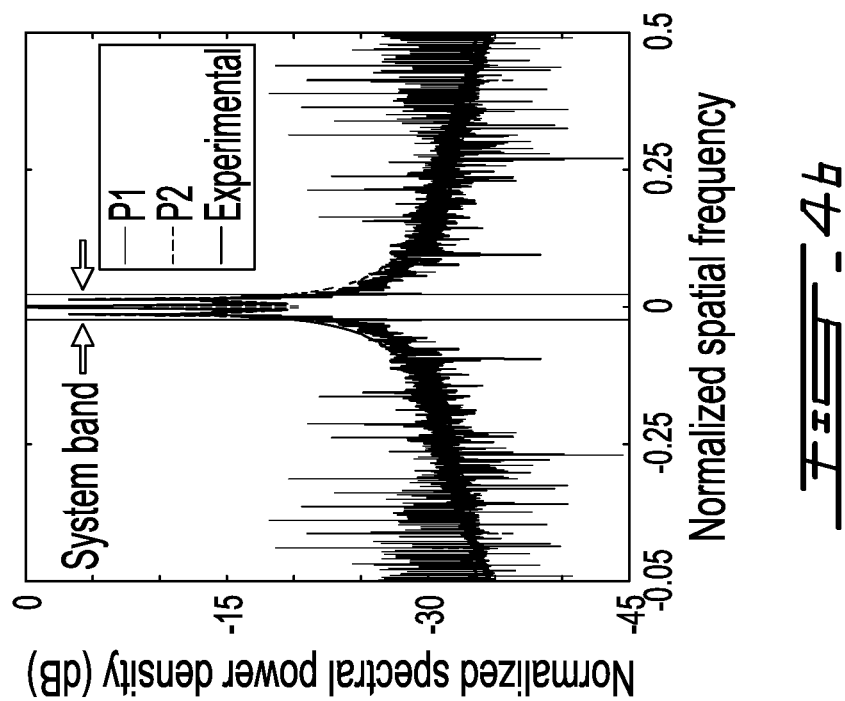
FIG. 4B is a comparison of central cross sections of spectral power density of a target sinusoidal pattern, a corresponding binary DMD pattern, and experimentally captured image.

In a method for real-time, high-speed 3D surface imaging in a CoaXPress-interfaced band-limited illumination profilometry (CI-BLIP) according to an embodiment of an aspect of the present disclosure, band-limited illumination is thus used to generate and project high-quality sinusoidal fringe patterns at 5 kHz. The set of target images contains four grayscale sinusoidal fringe patterns (648-μm period) with phase shifts from 0 to $3\pi/2$ with a step of $\pi/2$ as well as one vertical stripe pattern. Each individual grayscale fringe pattern is first converted to its corresponding binary DMD pattern using an adaptive error diffusion algorithm [27] as described in Supplementary section Note 1 hereinbelow and FIG. 9. The generated binary DMD patterns have blue noise characteristics in the spatial frequency domain, which manifest by imaging content precisely matched to the corresponding grayscale pattern within the bandwidth of the system (FIG. 4B). The 150-μm pinhole 22 placed at the Fourier plane in the 4f imaging system is used to filter high-spatial-frequency noise. The resultant beam profile shows high-quality grayscale sinusoidal fringes (FIG. 4C), with a root-mean-square error of 4.18% with respect to the target pattern. The band-limited illumination method is thus shown to generate accurate sinusoidal patterns at the conjugate plane of the DMD, which avoids the depth-dependent blurring effect and image distortion, thus improving the operating flexibility method compared with binary defocusing methods.

Figure 10:
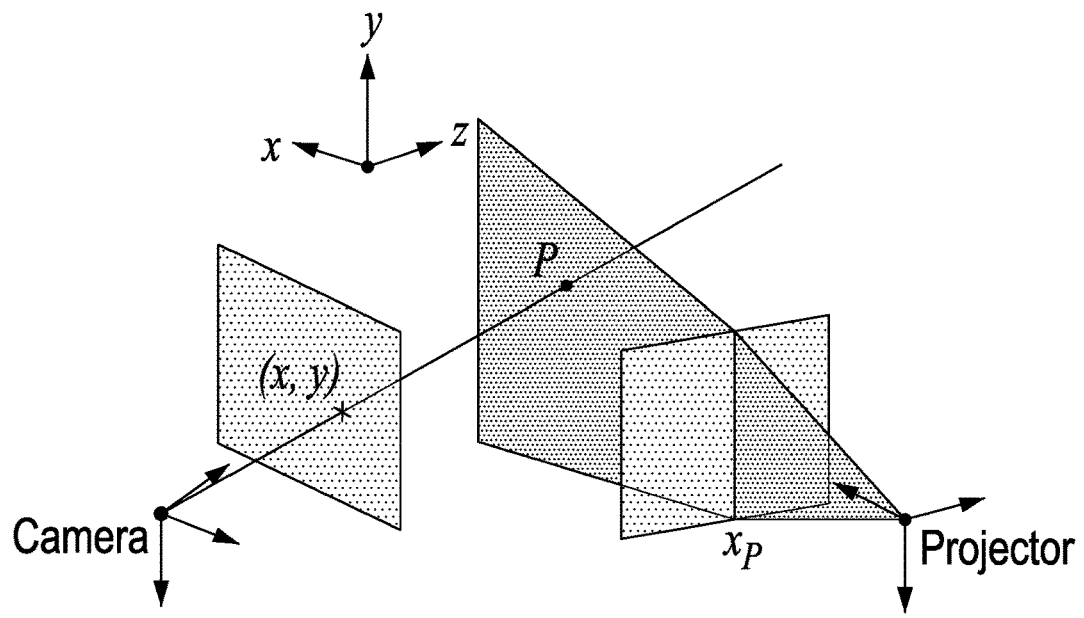
FIG. 10 schematically shows geometry of point determination.

Moreover, combining a CoaXPress-interfaced high-speed camera with a GPU-based software provides a synergy between the high-speed camera interface and the GPU-based processing that allows real-time high-speed 3D image reconstruction. The CXP cable 32, with a bandwidth of 25 Gbps, enables continuous streaming of fringe images to the host computer 30 during image acquisition at 5 kHz. These images are stored into RAM via direct memory access operations independent from the CPU. After determining the vertical stripe pattern, the calibration frame and four fringe patterns in GPU are processed, beginning with the parallelized extraction of wrapped phase and quality map information (see Supplementary section Notes 2-5 and FIG. 10 hereinbelow). Phase unwrapping is then carried out via the GPU accelerated implementation of a two-dimensional (2D) weighted phase unwrapping algorithm [28, 29], which uses the quality map information to guide the unwrapping procedure against errors induced by noise. The selected algorithm relies on the independent manipulation of points using 2D discrete cosine transformation [30]. Absolute phase is then computed in parallel by adding a constant determined from the vertical stripe pattern. Finally, coordinate information is recovered from the absolute phase map from each pixel via matrix inversion, enabling real-time 3D position tracking at 1 kHz. Thus, continuous streaming of fringe images to the host computer during image acquisition at 5 kHz with a bandwidth of 25 Gbps and a real-time three-dimensional position tracking at 1 kHz is achieved.

Figure 5C:
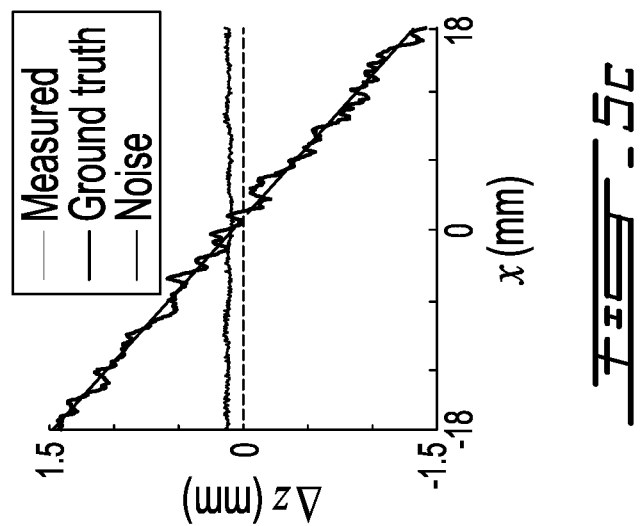
FIG. 5C shows a measured depth difference between the planar surfaces of FIG. 5B.
Figure 5B:
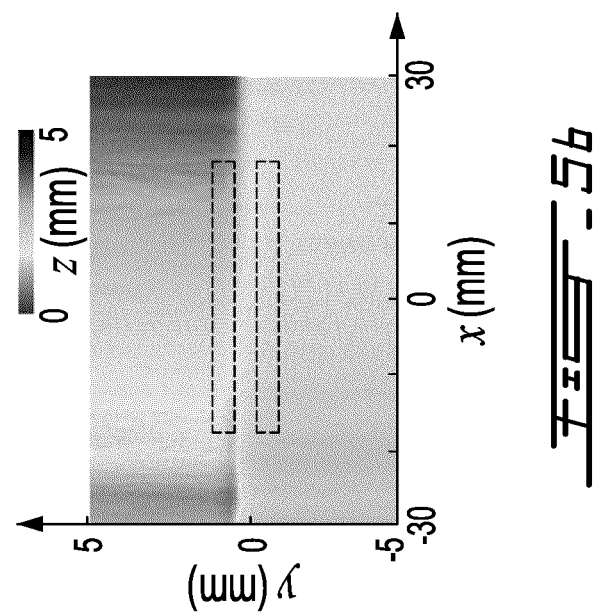
FIG. 5B shows a reconstructed image of planar surfaces of an object, dashed boxes representing selected regions for analysis.
Figure 5A:
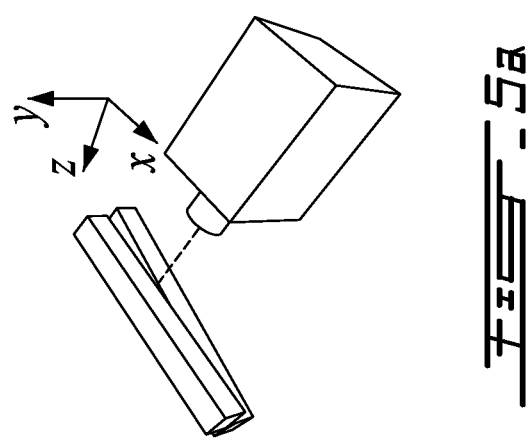
FIG. 5A is a schematical view of an experimental setup for quantification of the depth resolution of the system of FIG. 4A.

To quantify the depth resolution of the CoaXPress-interfaced band-limited illumination profilometry of the present disclosure, two stacked planar surfaces offset by about 5° were imaged (FIG. 5A). In this configuration, the depth difference between the two surfaces along the x axis increased monotonously, starting from negative maximum at the right edge, to zero at the center, and reaching positive maximum at the left edge. The reconstructed image of the 3D object (FIG. 5B) allowed analyzing cross sections of depth at different×positions (see FIG. 14A and Supplementary Note 6 hereinbelow). The depth difference (denoted by Δz) of the two surfaces, which closely agrees to the ground truth, was calculated (FIG. 5C). In addition, standard deviations of the measured depths were used as the noise level of the system. The depth resolution was defined as when Δz is two times the noise level of the system. The depth resolution of CoaXPress-interfaced band-limited illumination profilometry (CI-BLIP) was 0.15 mm.

Various static 3D objects were imaged to assess the feasibility of CoaXPress-interfaced band-limited illumination profilometry (CI-BLIP). First, three interlocking brick toys, with studs of respective heights of 23 mm, 15 mm, and 3 mm, were measured. Reconstructed results and selected centerlines are plotted in FIG. 6A, showing that the structure information of the brick toys is accurately recovered, allowing for example identification of shallow dents of a depth of about 1 mm at the centers of the studs (see arrows in FIG. 6A). Experiments conducted on single and multiple animal toys (FIGS. 6B-6C). The depth information is shown in two perspective images and the detailed surface structures are illustrated by close-up views.

To assess real-time high-speed 3D surface profilometry, CoaXPress-interfaced band-limited illumination profilometry (CI-BLIP) was used to image an electric fan rotating at 300 rounds per minute. The fan has seven blades, each having a tilt angle of bout 30°. FIG. 7A shows the front view of reconstructed 3D images at four time points and FIG. 7B shows a representative side view (FIG. 7B). Detailed 3D shapes of the base, center hub, side cover, blades, and bars underneath the blades can be identified, showing that the present method allows tracking the evolution of depth over the entire FOV. As an example, FIG. 7C shows line profiles along the radial direction (marked by the solid line in the first panel of FIG. 7A) over time. The blade quickly swept through the radical profile in 14 ms, resulting in a maximum change in depth of 6 mm. To further analyze details in depth dynamics, FIG. 7D shows the depth profiles of three points, including one point on the central hub ($p_A$) and two points along a blade ($p_B$ and $p_C$). The depth profiles of $p_A$ to $p_C$ clearly illustrate the linear relationship between the displacements of the fan blades with different radii at a constant angular speed of about 30 rad/s. The depth of $p_A$ does not show apparent change, which is in accord with the flat central hub. The periodic displacements in depth of $p_B$ and $p_C$ show that the fan had a rotation period of approximately 210 ms. These measured results are in agreement with preset experimental conditions. Selected results from the 1-kHz real-time reconstruction of this scene were displayed at 60 Hz and also showed real-time 1-kHz tracking of the 3D position of a selected single point.

Figure 8A:
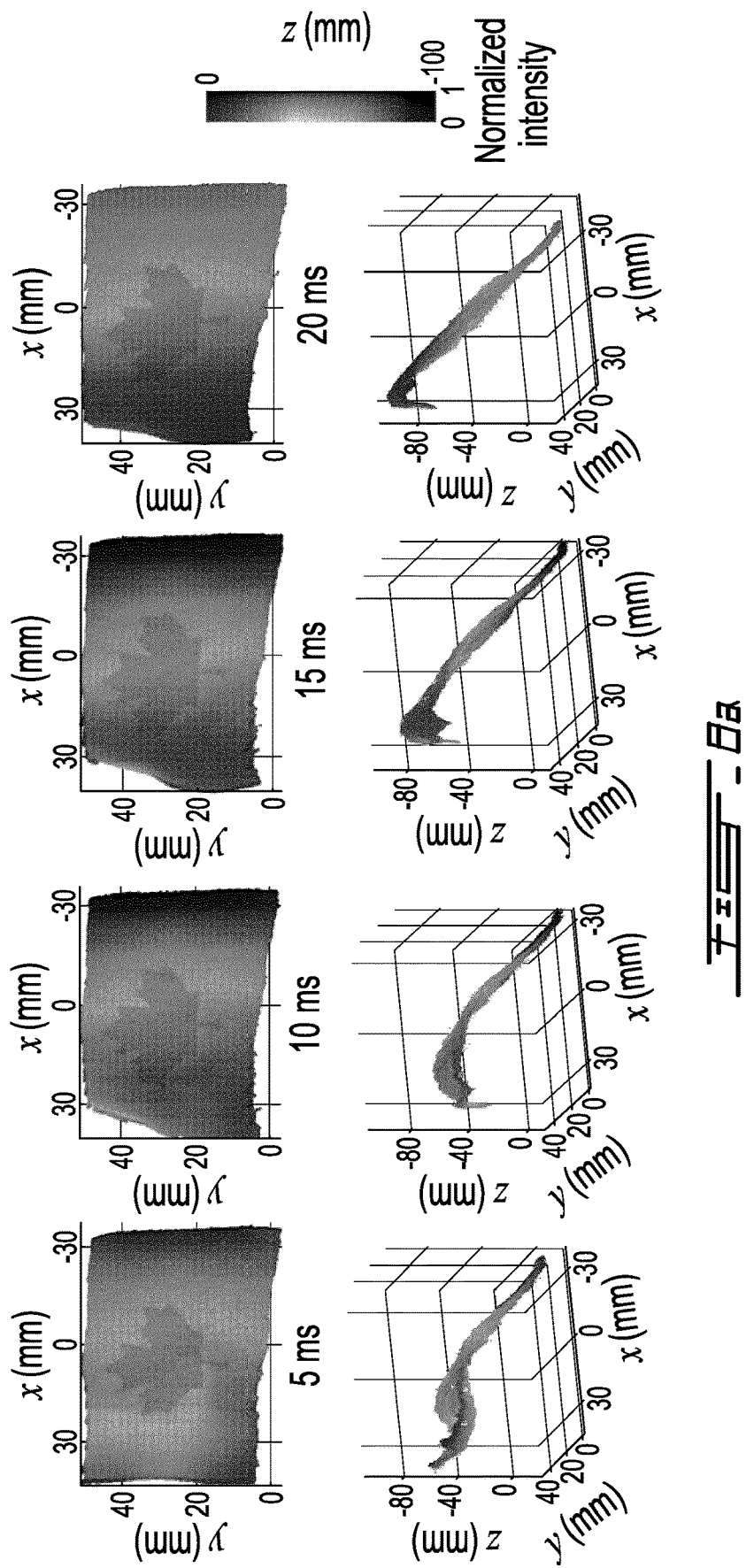
FIG. 8A shows reconstructed 3D images of a flapping flag at different times.

The method and system were further used to image flapping dynamics of a flag with a maple leaf pattern (80 mm×50 mm in size) mounted on a pole and exposed to a strong wind produced by an air blower. FIG. 8A shows representative 3D images of instantaneous poses of the flapping flag from two perspective views, showing a wave travelling toward the edge at approximately 2 m/s. Time histories of the streamwise (x axis), spanwise (y axis), and transverse (z axis) displacements of three selected points marked as $p_A$, $p_B$, and $p_C$, with $p_A$ at the mid-point in the y axis; $p_B$ and $p_C$ having the same x coordinate are shown (FIG. 8B). The displacements of $p_A$ have the smallest amplitudes in all three directions, representative of a less intense flapping motion in the part of the flag closer to the pole. The streamwise and transverse displacements of $p_B$ and $p_C$ show an apparent phase difference, which is attributed to a gravity-induced sagging effect. The phase relation between the spanwise and transverse displacements of $p_C$ (FIG. 8C) exhibits an elliptical shape in both experimental and fitted results, showing that the flapping motion is dominated by single-frequency sinusoidal waves. Finally, the depth curves of the middle line of the flag in all reconstructed images (FIG. 8D) shows an asymmetric flapping motion toward the +z direction, which indicates uneven forces submitted to the flag surface and a relatively high degree of turbulent flow.

A CoaXPress-interfaced band-limited illumination profilometry (CI-BLIP) according to an embodiment of an aspect of the present disclosure comprises generating a binary pattern, in which a grayscale sinusoidal pattern is processed by an adaptive error diffusion algorithm into a corresponding binary pattern able to be displayed on the DMD with upper limit speed (step 110). Band-limited illumination of the object then makes use of a 4f imaging system with a pinhole on the Fourier plane to filter high-spatial frequency noise, as well as a projector lens to project the pattern displayed on the DMD; each binary pattern displayed on the DMD is projected to be a grayscale sinusoidal image with high quality (step 120). A calibration step may comprise imaging a checkerboard with multiple different positions and calculating the spatial relationship by a calibration toolbox in MATLAB, so as to determine the extrinsic and intrinsic parameters of the pinhole models of camera and projector (step 230). In a data acquisition step (step 140), a CoaXPress interface is used between the camera and the host computer to continuously stream data at 25 Gbps, for acquisition of images carried with objects structural information are acquired and transferred to GPU. In a reconstruction step (step 150), the absolute phase value is calculated by GPU parallel processing and transferred into spatial information with calibration data. The 3D information (x,y, z) of the object's surface is extracted from each full-sequence (five images) of structured pattern illumination. The solved depth values are linearly mapped to an 8-bit range suitable for real-time display, the dynamic of objects in 3D being displayed at 60 Hz (full frame), with single point depth tracking at 1 kHz.

There is thus provided a CoaXPress-interfaced band-limited illumination profilometry (CI-BLIP) method that integrates band-limited illumination, CoaXPress-interfaced high-speed image acquisition, and GPU-based image reconstruction. The present high-speed structured-light profilometry (SLP) system and method allow real-time 3D position tracking at 1 kHz, which may be further improved by using a high-power laser, a faster camera interface [32], and advanced phase unwrapping algorithms [33].

The present method and system may be used in a range of applications, including in-situ industrial inspection, dynamic biometric analysis, and vibration measurement for acoustics.

They may be combined with studies of fluid-structure interactions. The mechanisms that govern the flag-wind interaction has generated scientific interests in diverse studies [37], including animal ethology [38], paper engineering [39], and hydroelectric power generation [40]. Due to its complex geometries and freely moving boundaries [31], study the gravity-induced impact in flag-fluid interaction remains a challenge. Thus far, although many simulation works have been carried out to investigate the relation between gravity and the stability of flags with different flow air conditions [41-43], experimental visualization of real-time flag movement is still a challenge. A limited number of experiments were conducted using low flow speeds [44, 45] and rigid flags, which restricted the analysis of fluid dynamics in 2D.

In contrast, the present CoaXPress-interfaced band-limited illumination profilometry (CI-BLIP) system and method allow 3D analysis of a travelling wave, the gravity-induced phase mismatch, and the asymmetric fluctuation of a non-rigid flapping flag at 1 kHz. The ability of the present CoaXPress-interfaced band-limited illumination profilometry (CI-BLIP) system and method for continuous streaming acquired data may also contribute to imaging unpredicted or non-repeatable flow dynamics.

Supplementary Section

Note 1: Design of Band-Limited Illumination

Design of binary patterns: The gradient-based adaptive error diffusion (GAED) algorithm [27], a halftoning technique, was used to design the binary patterns that were loaded onto the digital micromirror device (DMD). In the experiment, four grayscale sinusoidal patterns, with a period of 60 digital micromirror device (DMD) pixels and with phase shifts of 0, $$\frac{\pi}{2}, \pi, \text{ and } \frac{3\pi}{2}$$

Figures 9A, 9B:
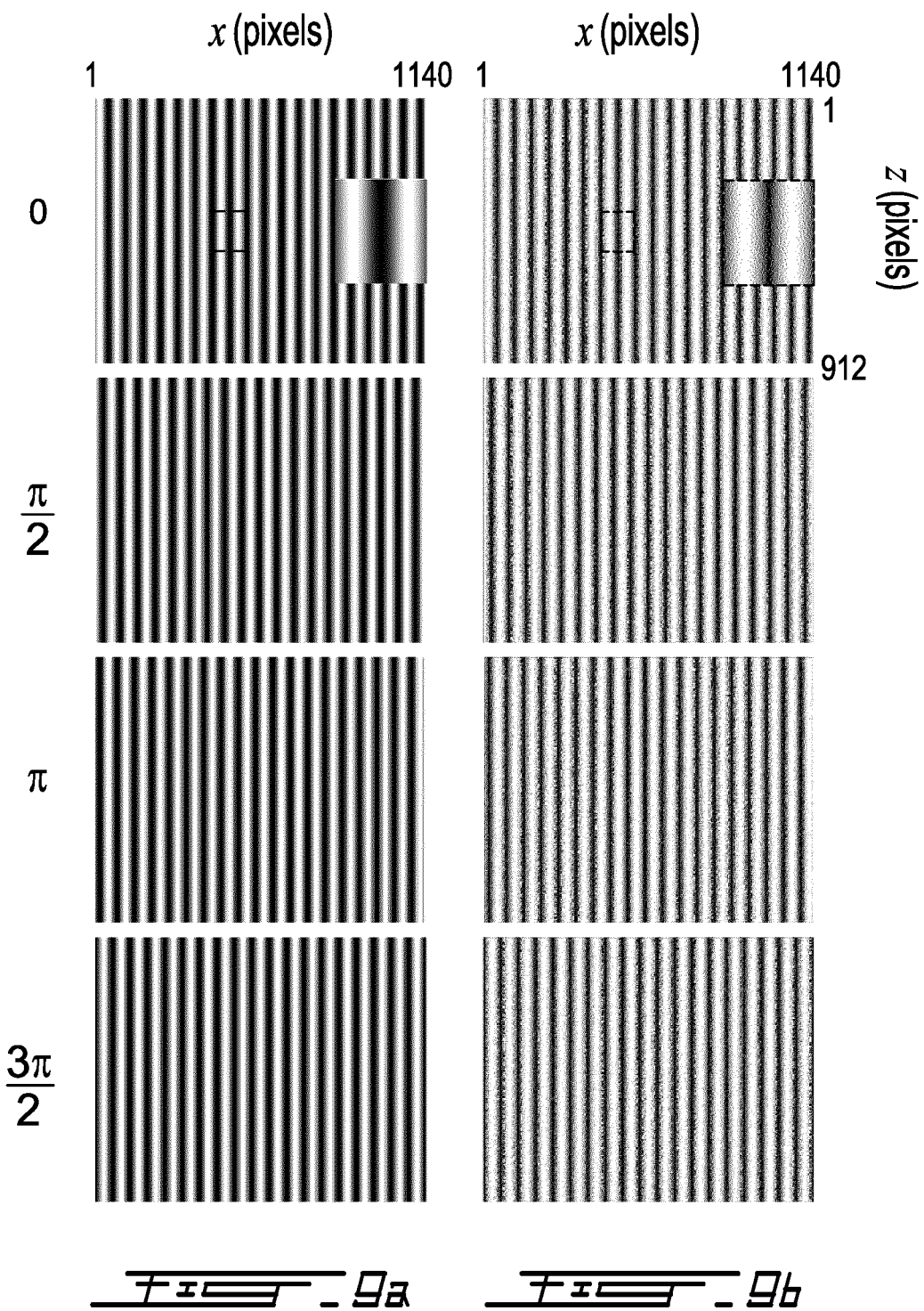
FIG. 9A shows the target fringe patterns.
FIG. 9B shows binary DMD patterns corresponding to the target fringe patterns of FIG. 9A, close-up views in the first panels show the grayscale and binary characteristics of the target pattern and the DMD pattern, respectively.

(Supplementary FIG. 1 left column) were used as the input images. Each grayscale pattern was processed by the GAED algorithm to produce one binary digital micromirror device (DMD) pattern pixel by pixel from left to right in a row and then from top to bottom row by row. For a specific digital micromirror device (DMD) pixel, its binary value was determined by a dynamic threshold that depended on the gradient magnitude of the current pixel in the grayscale image [27]. Then, the binarization error of the processed pixel in the grayscale image was diffused to the neighboring pixels based on specific weights, which resulted in the intensity change of the surrounding pixels accordingly. By raster processing, the binary digital micromirror device (DMD) pattern was obtained (FIG. 9B).

Determination of the bandwidth of the system: The bandwidth of the system is controlled by a pinhole as a low-pass filter. The diameter of the pinhole, D, is calculated by $$D = \frac{\lambda f_3}{P_f}, \tag{S1}$$

where $P_f$=648 μm denotes the fringe period (which equals to 60 digital micromirror device (DMD) pixels), λ=671 nm is the laser wavelength, $f_3$=120 mm is the focal length of L3. Thus, the required pinhole diameter size is D=124.26 μm. In the experiment, a 150-μm pinhole was used in the simulation to conduct optical low-pass filtering. The corresponding normalized system bandwidth is 0.01. It is worth noting that the actual pinhole size is slightly larger than the calculated value so that all spatial frequency content of the sinusoidal fringe pattern are guaranteed to pass through it Note 2: Geometry of Point Determination in 3D Space The geometrical configuration of the method, following that of conventional structured-light profilometry, is shown in FIG. 9, which show the target fringe patterns (FIG. 9A) and their corresponding binary DMD patterns (FIG. 9B). Close-up views in the first panels show the grayscale and binary characteristics of the target pattern (FIG. 9A) and the DMD pattern (FIG. 9B), respectively Adopting the usual pinhole model, a selected camera pixel (x, y) and the center point of the camera determine a line that emerges from the camera into space. The 3D coordinates of an object point viewed from the pixel, although constrained to this line, are indeterminate because of the usual loss of depth information in 2D images. The projector, modeled as a "reverse" pinhole camera, serves to recover this information by encoding points along this line within a deterministic sequence of structured light patterns. After a sequence of such projections is recorded by the camera, 3D coordinates can be recovered by examining the intensity sequence reported by each camera pixel. Despite a vast and still-growing number of general patterning schemes [18], it is sufficient to deploy patterns that encode only the columns of the display surface of the projector. Thus, FIG. 10 considers the case in which the intensity sequence of a (x, y) pixel decodes to a corresponding column $x_P$ of the DMD. This column and the center point of the projector determine a plane whose intersection with the projected camera ray determines the recovered 3D point.

Mathematically, the relationship between a 3D point $P=[X\ Y\ Z]^T$ and its locations on the 2D camera sensor (x, y) and DMD ($x_P$, $y_P$) are described as $$s\begin{bmatrix} x \\ y \\ 1 \end{bmatrix} = A\,[R,T]\begin{bmatrix} P \\ 1 \end{bmatrix}, \text{ and } s_P\begin{bmatrix} x_P \\ y_P \\ 1 \end{bmatrix} = A_P[R_P, t_P]\begin{bmatrix} P \\ 1 \end{bmatrix}, \tag{S2}$$

where $[x\ y\ 1]^T$ and $[x_P\ y_P\ 1]^T$ are the homogenous coordinates of the camera pixel and the DMD pixel respectively, {R, $R_P$} are 3×3 rotation matrices, {T, $T_P$} are 3×1 translation vectors, $[P\ 1]^T = [X\ Y\ Z\ 1]^T$ are the homogenous coordinates of P, and {s, $s_P$} are arbitrary scaling factors.

The matrices [R, T] and [$R_P$, $T_P$] describe the "extrinsic" properties of the camera and projector by defining their positions and orientations relative to the world coordinate system. On the other hand, the 3×3 matrices {A, $A_P$} describe the "intrinsic" image forming properties of the pinhole camera/projector, and each takes the form:

$$\begin{bmatrix} f_x & \alpha & x_0 \\ 0 & f_y & y_0 \\ 0 & 0 & 1 \end{bmatrix}, \tag{S3}$$

where {$f_x$, $f_y$} describe separate horizontal and vertical focal lengths, ($x_0$, $y_0$) identify the coordinates of the principal point of the image plane, and a accounts for (possible) pixel skewness. Together, {A, R, T} form a set of calibration parameters that must be estimated separately for both the camera and projector. With knowledge of the calibration parameters, and once (x, y) and $x_P$ are determined, Equation (S2) can be rearranged into a single matrix equation of the form $[x\ y\ x_P]^T = M\,P$, from which the 3D point P is recovered via matrix inversion.

Supplementary Note 3: Phase Shifting and Unwrapping

In phase shifting profilometry, 3D measurement begins with the capture of N fringe images of the 3D scene under illumination from N fringe patterns. Because of equal fringe shifting, a pixel at camera coordinate (x, y) will report a sinusoidally varying intensity across the acquired images. This intensity response can be considered as $$I_k(x,y) = I'(x,y) + I''(x,y)\cos\,[\varphi(x,y) - 2\pi k/N], \tag{S4}$$

Here $I_k$(x, y) represents the camera recorded intensity from the pixel at coordinates (x, y) in the $k^{th}$ image. I'(x, y) and I"(x, y) represent the average pixel intensity and intensity modulation depth due to fringe projection, φ(x, y) represents a phase offset, and k=0,1, . . . N−1. In particular, φ(x, y), encoded by the corresponding location of the pixel within the field of view of the projector, enables 3D reconstruction. Across all image pixels, the three parameters φ(x, y), I'(x, y), and I"(x, y) can be found as $$\varphi(x,y) = \tan^{-1}\left(\frac{\sum_{k=0}^{N-1} I_k(x,y)\sin\left(\frac{2\pi k}{N}\right)}{\sum_{k=0}^{N-1} I_k(x,y)\cos\left(\frac{2\pi k}{N}\right)}\right), \tag{S5}$$

$$I'(x,y) = \frac{1}{N}\sum_{k=0}^{N-1} I_k(x,y), \text{ and} \tag{S6}$$

$$I''(x,y) = \frac{2}{N}\sqrt{\left[\sum_{k=0}^{N-1} I_k(x,y)\sin\left(\frac{2\pi k}{N}\right)\right]^2 + \left[\sum_{k=0}^{N-1} I_k(x,y)\cos\left(\frac{2\pi k}{N}\right)\right]^2}. \tag{S7}$$

Figure 11A:
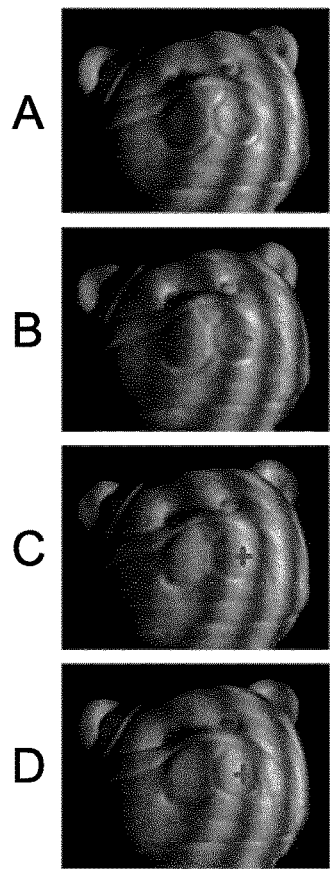
FIG. 11A shows four-step phase shifted illumination.
Figure 11B:
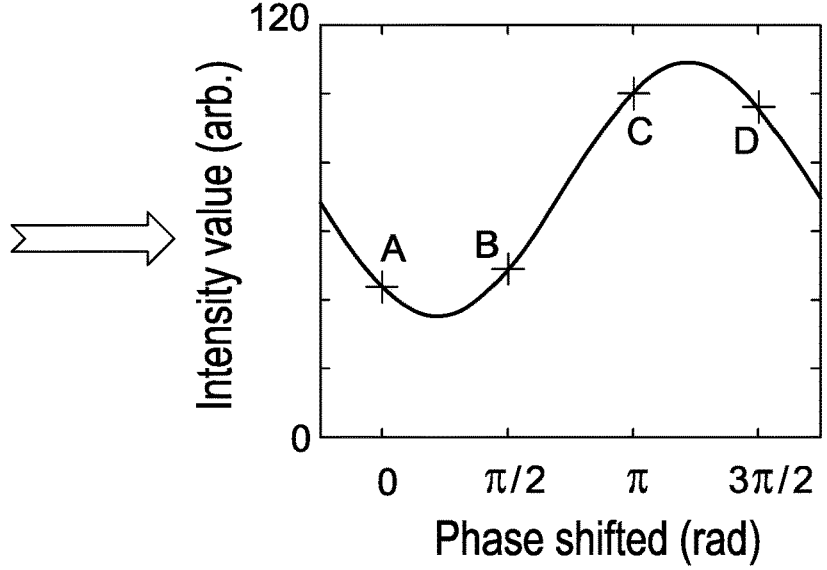
FIG. 11B shows an intensity profile of a selected pixel.

Since values of φ(x,y) are fundamentally determined only up to multiples of 2π, Equation (S5) provides wrapped values in the interval (−π, π]. Importantly, since Equations (S5)-(S7) solve for three parameters, it is generally required that N≥3. In the present work, N=4 (see FIG. 11) was used, for which the form of Equation (S5) becomes $$\varphi(x, y) = \tan^{-1}\left(\frac{I_1 - I_3}{I_0 - I_2}\right).$$

To perform 3D reconstruction on objects, it is necessary to unwrap and possibly offset the values of φ(x,y) to obtain an absolute phase that can be converted to the coordinates of a pixel within the field of view of the projector. The weighted discrete cosine transform based phase unwrapping procedure [29, 28] was used. For this phase unwrapping procedure, the modulation values I"(x,y) were used to produce quality maps to guide unwrapping. To obtain absolute phase, a single vertical fringe was used as an additional pattern. Thresholding the values in this additional image allowed for a subset of the unwrapped phase map to be associated with the center of the DMD projector. Absolute phase was then obtained relative to the center of the DMD by averaging unwrapped phase values over the subset to obtain a phase offset value $\varphi_0$ that was subtracted from the unwrapped phase. Horizontal projector coordinates $x_P$ (x, y) were then obtained as a linear function of the absolute phase by:

$$x_p(x, y) = (\tilde{\varphi}(x, y) - \varphi_0)\frac{P_p}{2\pi} + \frac{1}{2}(N_x - 1), \quad \text{(S8)}$$

where $\tilde{\varphi}(x, y)$ is the unwrapped phase, $P_P$ is the fringe period (in pixels), and $N_x$ is the width of the DMD (in pixels).

Supplementary Note 4: Real-Time Image Processing

Figure 12:
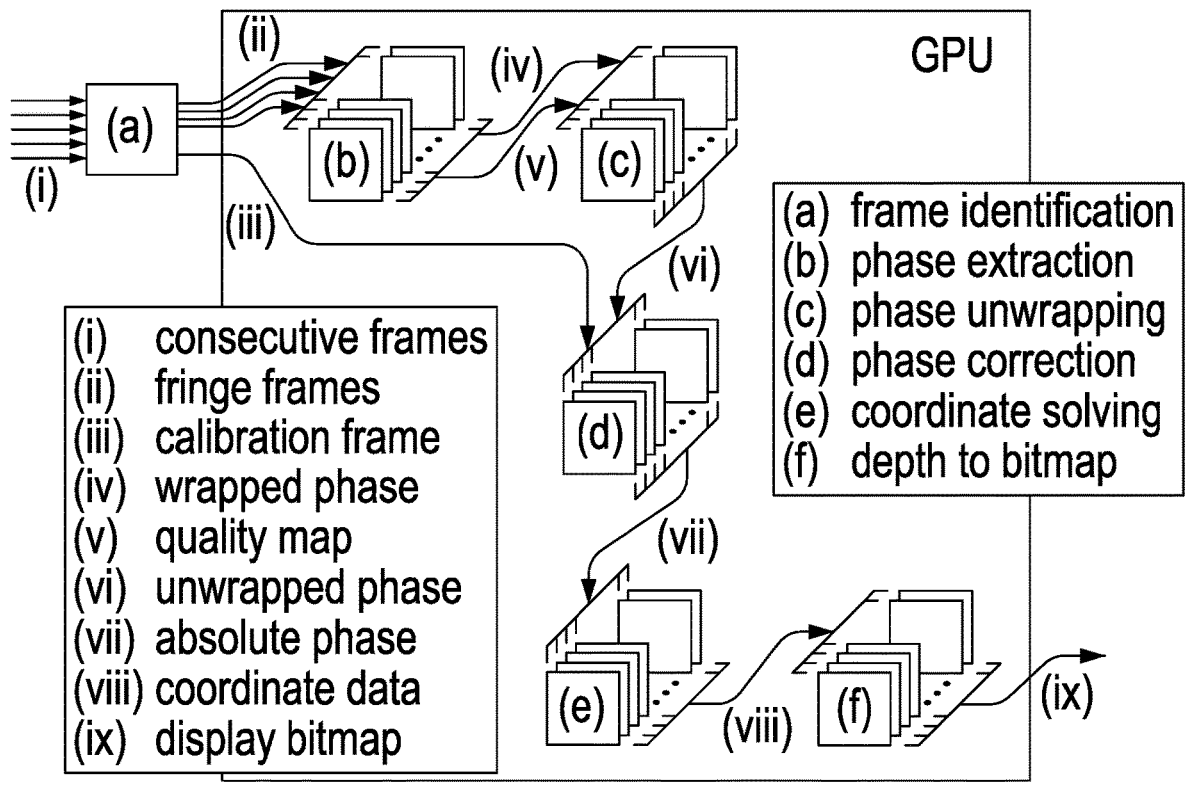
FIG. 12 is a flowchart of GPU-based real-time image processing.

Displayed in FIG. 12, first, a set of five consecutively recorded frames are distinguished into an ordered group of four frames containing fringe content and a single frame containing the DMD calibration fringe. Then, wrapped phase and quality map data are extracted according to the fringe shifting algorithm. Phase unwrapping determines unwrapped phase map. Absolute phase is determined using data from the calibration frame. In addition, pixel coordinate data are solved in parallel using Cramer's rule [48]. Finally, depth values are linearly mapped to produce a bitmap suitable for direct display.

Supplementary Note 5: System Calibration

Figure 13B:
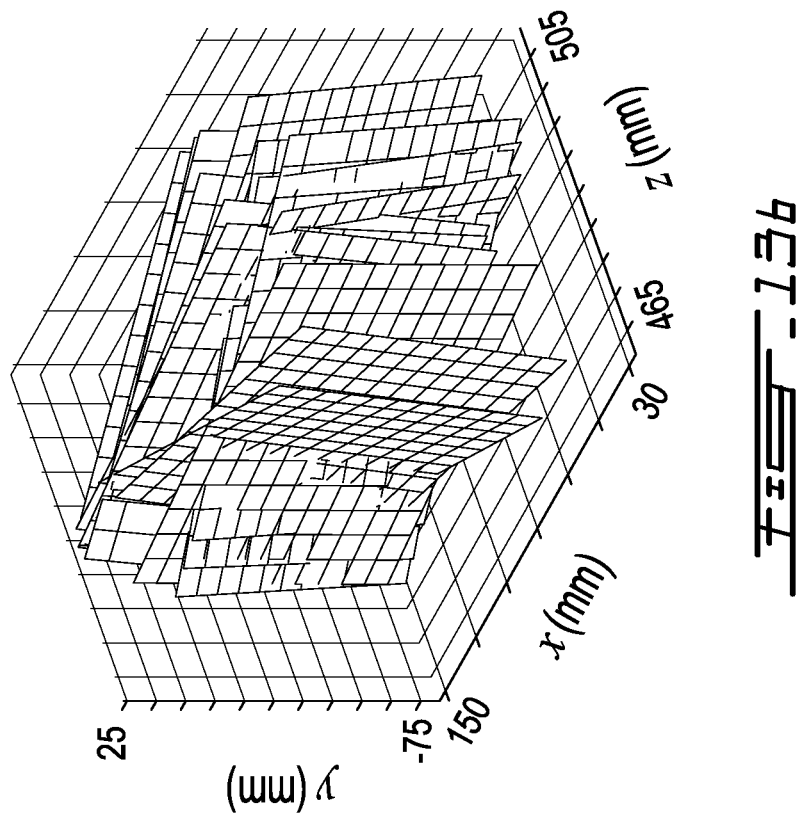
FIG. 13B shows camera calibration results with all the positions of the checkerboard poses.
Figure 13A:
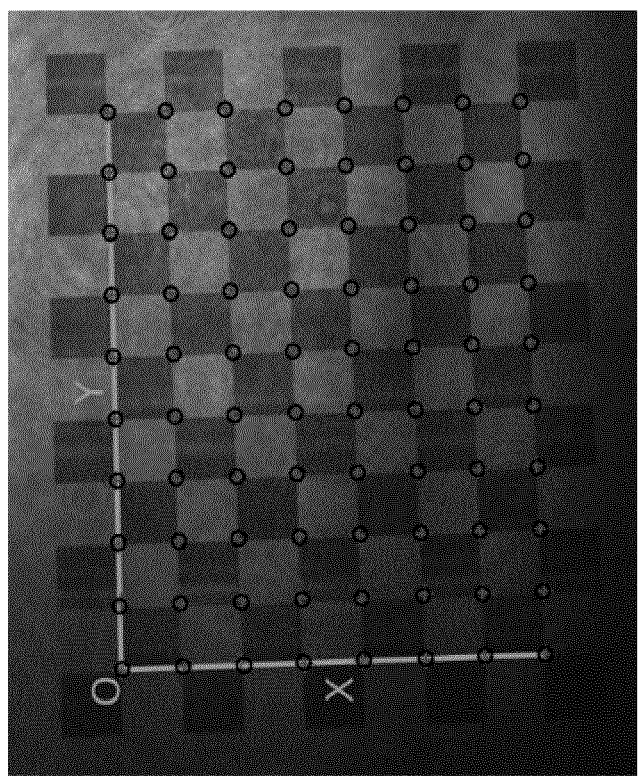
FIG. 13A shows, in a system calibration, a captured image of the checkerboard pattern, "0" representing the selected corner point; "X" and "Y" representing the 2D coordinates; dots representing the software extracted grid corners.

Camera calibration: The calibration of camera was conducted to extract the intrinsic parameters of the camera model. A 9×11 black/white checkerboard pattern was used, on which each square was 8 mm×8 mm in size (FIG. 13A). 20 poses of this checkerboard were imaged (FIG. 13B). A MATLAB toolbox [49] was used to extract the grid corners and calculate the camera's intrinsic parameters of the focal length, the principle point, pixel skewness, and distortion.

Figure 13C:
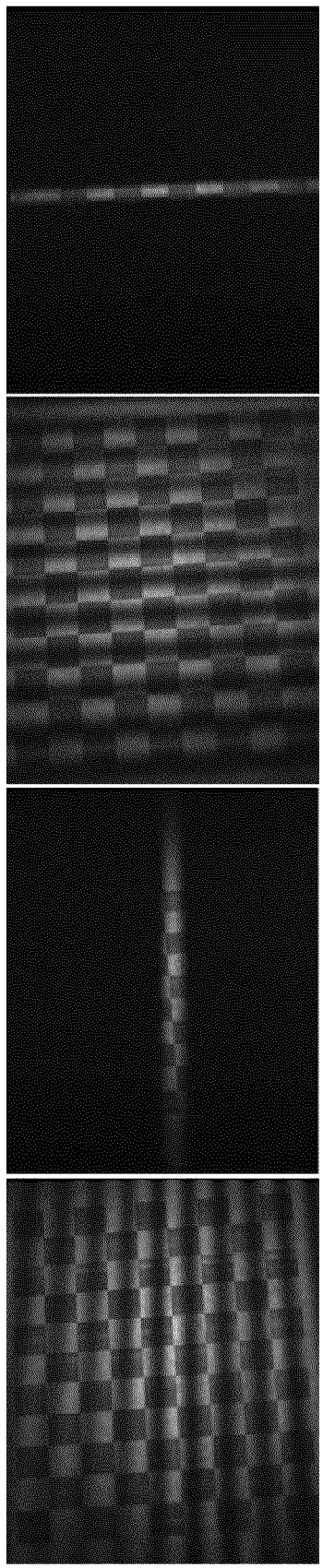
FIG. 13C shows images of a selected horizontal fringe pattern, the horizontal centerline, a selected vertical fringe pattern, and the vertical centerline.
Figure 13A:
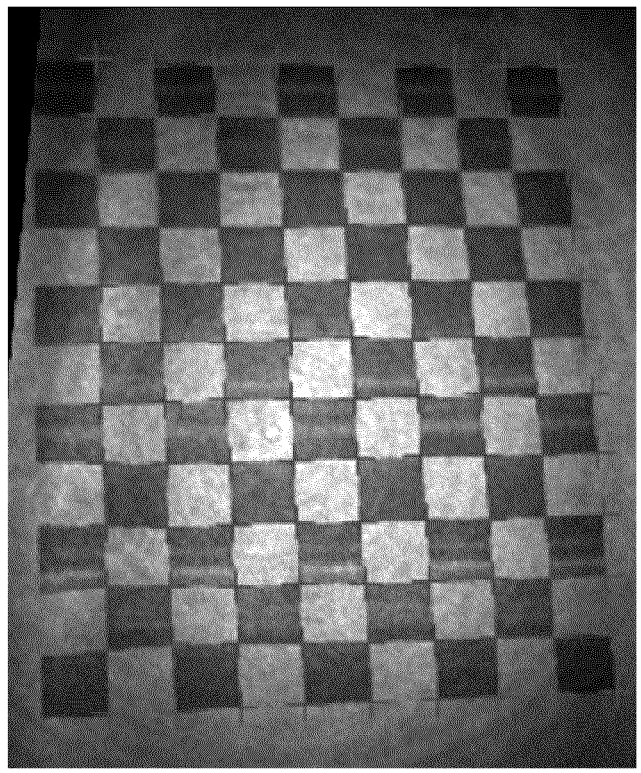
Figure 13B:
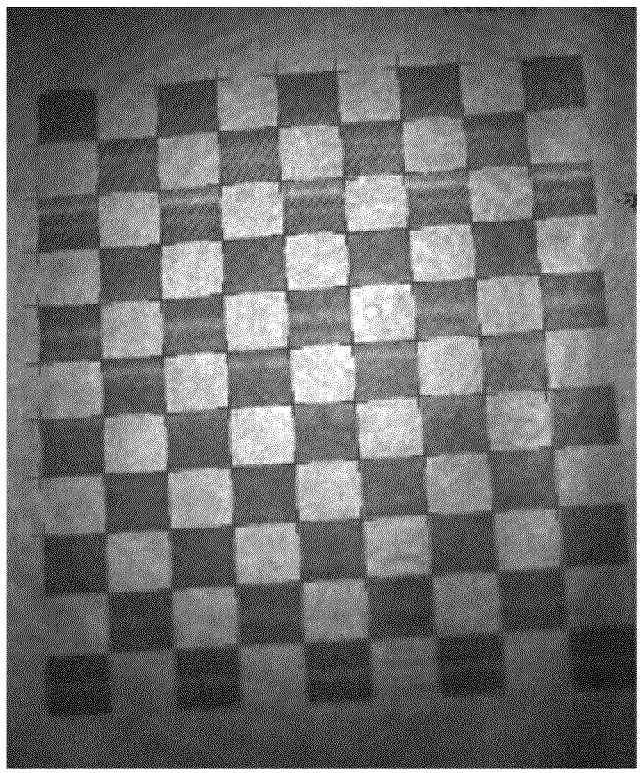

Projector calibration: In the calibration of projector, the key concept is to enable the projector to "capture" images like a camera, thus making the calibration the same as that of a camera. The method [50] involved capturing additional images of the checkerboard pattern under illumination of both horizontally and vertically shifted fringe patterns (FIG. 13C). Estimation of the absolute phase from these images was carried out using the four-step phase shifted algorithm as described in Supplementary Note 3. Then, the absolute phase maps extracted for both the horizontal and vertical directions were used to determine a pixel-wise mapping between camera-captured images of the checkerboard plane (FIG. 13D) into correctly altered images representing the view of the checkerboard plane from the perspective of the projector (FIG. 13E). Finally, the MATLAB toolbox was used to compute the calibration parameters of the projector, including the principal point, the focal length, and skewness.

Supplementary Note 6: Additional Information of Depth Resolution Quantification

Figure 14A:
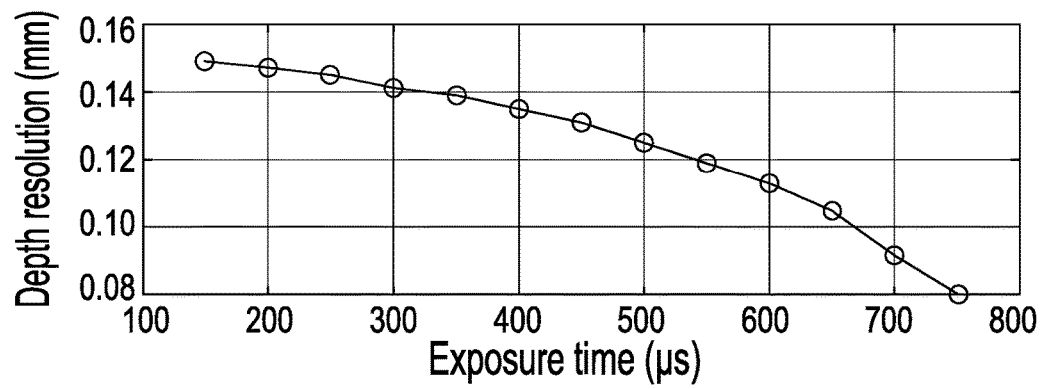
FIG. 14A, in determination of minimal exposure time in depth resolution quantification, shows a relation between measured depth differences and the corresponding exposure times.
Figure 14B:
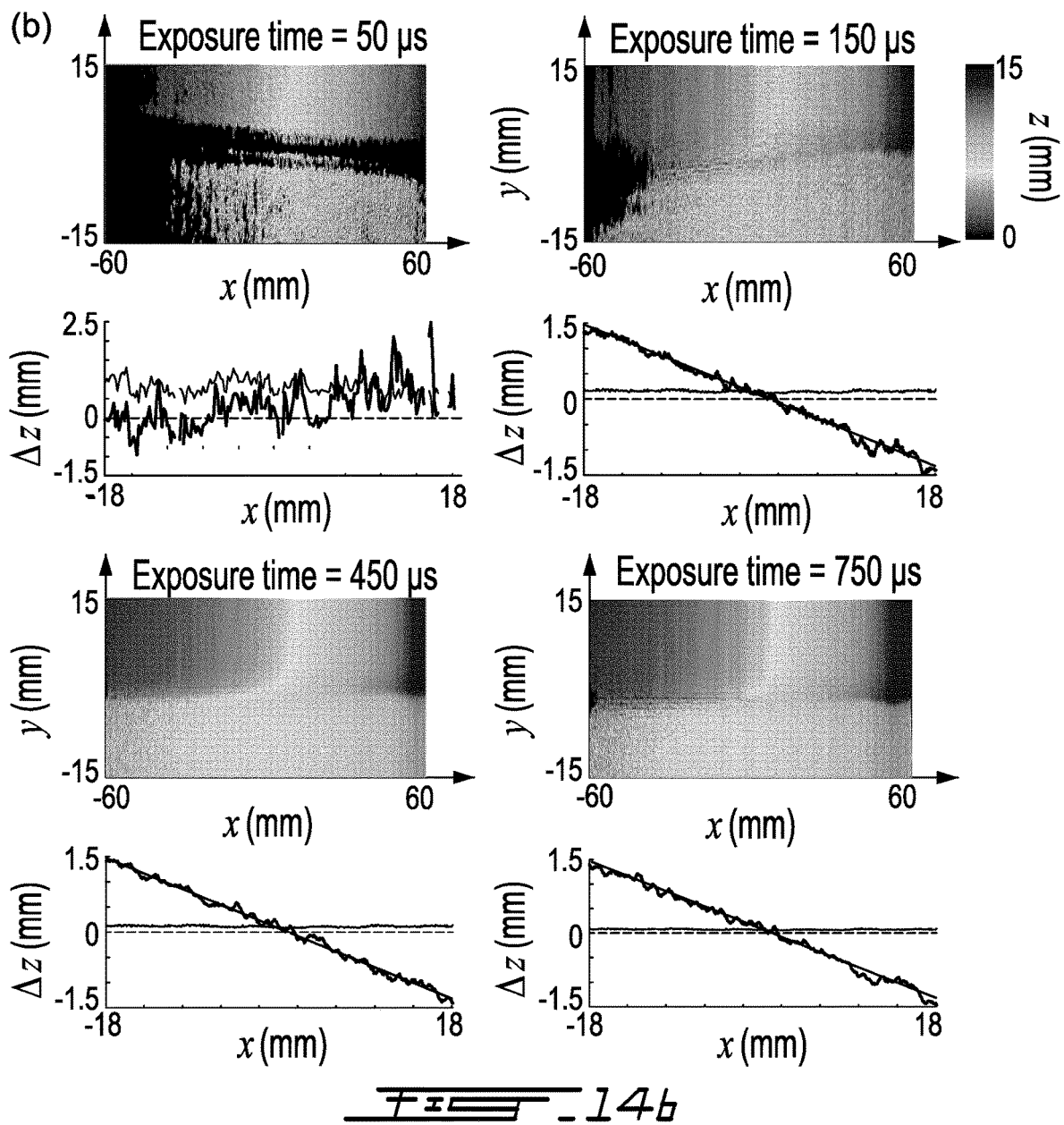
FIG. 14B shows 3D images of the planar surfaces and measured depth difference at four exposure times.

FIG. 14 show the experimental results of depth resolution quantification with different exposure times. The reconstruction results deteriorate with short exposure times (FIG. 14A) In particular, at the exposure time of 150 μs, the limited number of scattered photons received by the camera resulted in an unsuccessful reconstruction in a small area on the left. However, the rest of the planar surfaces could still be recovered. At the exposure time of 50 μs, the region of unsuccessful reconstruction prevailed across the entire planar surfaces. Further analysis (FIG. 14B) shows that that the noise dominates the calculated depth difference. Therefore, the minimal exposure time was determined to be 150 μs.

Figure 15B:
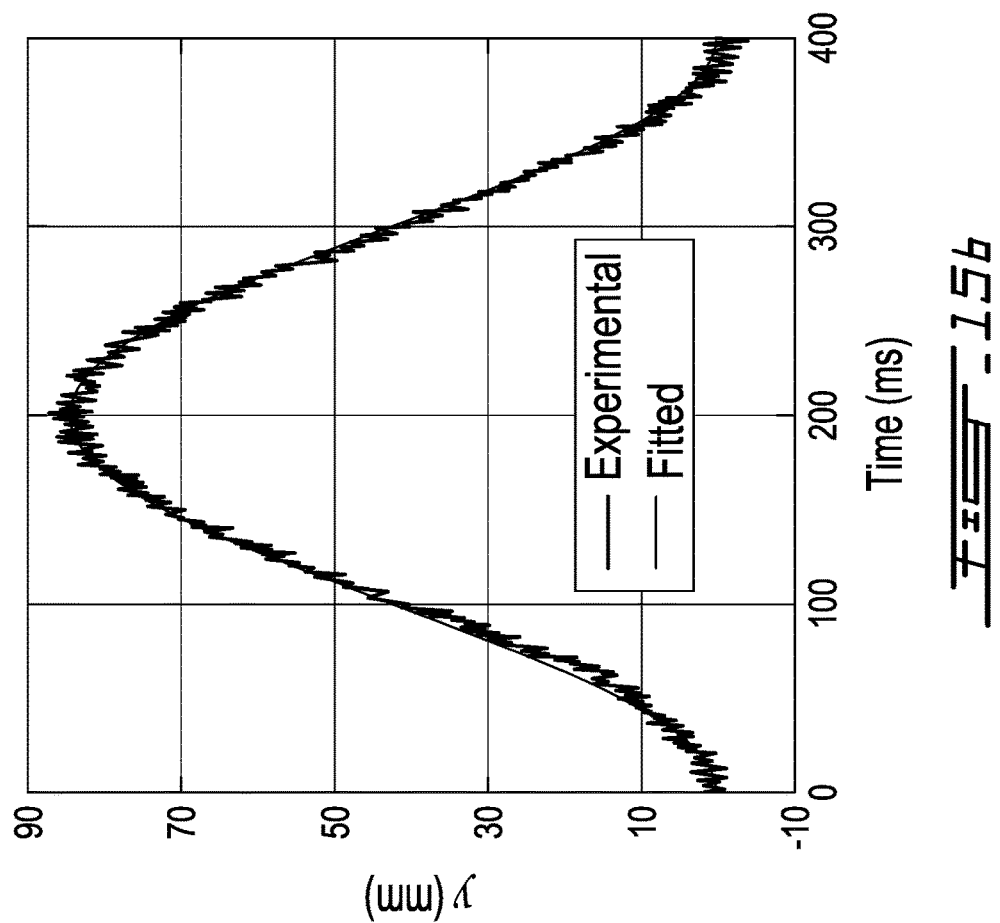
FIG. 15B shows depth traces of a selected point shown in FIG. 15A.
Figure 15A:
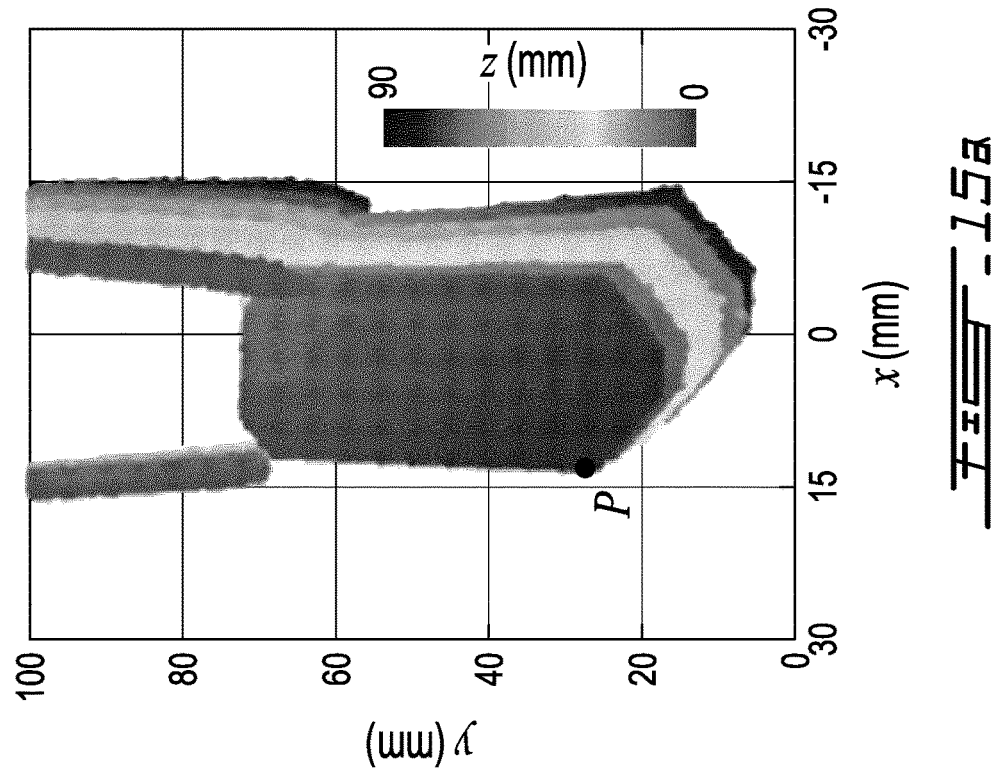
FIG. 15A, in case of a real-time 3D imaging of a swinging pendulum at 1 kHz, shows representative 3D images of the swinging pendulum at five different times.

Supplementary Note 7: Additional Information of Real-Time kHz 3D Imaging of Dynamic Objects FIG. 15 shows another dataset of high-speed 3D surface imaging of a swinging pendulum using CI-BLIP. Five representative 3D images of the pendulum at different times are shown in FIG. 15A. The depth evolution of a selected point on the pendulum was also tracked over time, which is marked as P in FIG. 14A. This result was filtered by using $$z = A \sin\left[\frac{2\pi}{T}(t - t_0)\right] + B, \quad \text{(S9)}$$

where A=42, T=400, $t_0$=100, B=241. As illustrated in FIG. 15B, the sinusoidal displacements of the selected point shows a period of ~400 ms. The length of the pendulum was measured to be L=~40 mm, the theoretical swinging period can be calculated as $$T_{theroy} = 2\pi\sqrt{\frac{L}{g}}, \quad \text{(S10)}$$

where g=9.80665 m/s². $T_{theory}$ was calculated to be 401.4 ms, which closely agrees to the experimental result.

The scope of the claims should not be limited by the embodiments set forth in the examples but should be given the broadest interpretation consistent with the description as a whole.

REFERENCES

1. Z. Song, Handbook of 3D machine vision: optical metrology and imaging (2013), Vol. Chapter 9.
2. J.-A. Beraldin, F. Blais, P. Boulanger, L. Cournoyer, J. Domey, S. El-Hakim, G. Godin, M. Rioux, and J. Taylor, "Real world modelling through high resolution digital 3D imaging of objects and structures," ISPRS Journal of Photogrammetry and Remote Sensing 55, 230-250 (2000).

3. J. Stegmaier, F. Amat, W. C. Lemon, K. McDole, Y. Wan, G. Teodoro, R. Mikut, and P. J. Keller, "Real-time three-dimensional cell segmentation in large-scale microscopy data of developing embryos," Developmental cell 36, 225-240 (2016).
4. S. Seer, N. Brändle, and C. Ratti, "Kinects and human kinetics: A new approach for studying pedestrian behavior," Transportation Research Part C 48, 212-228 (2014).
5. M. Gosta and M. Grgic, "Accomplishments and challenges of computer stereo vision," in Proceedings ELMAR-2010, (IEEE, 2010), 57-64.
6. M. Hansard, S. Lee, O. Choi, and R. P. Horaud, Time-of-flight cameras: principles, methods and applications (Springer Science & Business Media, 2012).
7. S. Zhang, "Recent progresses on real-time 3D shape measurement using digital fringe projection techniques," Optics and lasers in engineering 48, 149-158 (2010).
8. S. Zhang, "Absolute phase retrieval methods for digital fringe projection profilometry: A review," Optics and Lasers in Engineering 107, 28-37 (2018).
9. J. Geng, "Structured-light 3D surface imaging: a tutorial," Adv. Opt. Photon. 3, 128-160 (2011).
10. C. Zuo, S. Feng, L. Huang, T. Tao, W. Yin, and Q. Chen, "Phase shifting algorithms for fringe projection profilometry: A review," Optics and Lasers in Engineering 109, 23-59 (2018).
11. S. S. Gorthi and P. Rastogi, "Fringe projection techniques: whither we are?," Optics and lasers in engineering 48, 133-140 (2010).
12. L. J. Hornbeck, "Digital light processing for high-brightness high-resolution applications," in Projection Displays III, (International Society for Optics and Photonics, 1997), 27-41.
13. X. Su and Q. Zhang, "Dynamic 3-D shape measurement method: a review," Optics and Lasers in Engineering 48, 191-204 (2010).
14. M. Vazquez-Arellano, H. Griepentrog, D. Reiser, and D. Paraforos, "3-D imaging systems for agricultural applications-a review," Sensors 16, 618 (2016).
15. B. Li and S. Zhang, "Novel method for measuring a dense 3d strain map of robotic flapping wings," Measurement Science and Technology 29, 045402 (2018).
16. B. Li and S. Zhang, "Superfast high-resolution absolute 3D recovery of a stabilized flapping flight process," Optics express 25, 27270-27282 (2017).
17. S. Van der Jeught and J. J. Dirckx, "Real-time structured light profilometry: a review," Optics and Lasers in Engineering 87, 18-31 (2016).
18. S. Zhang, "High-speed 3D shape measurement with structured light methods: A review," Optics and Lasers in Engineering 106, 119-131 (2018).
19. Y. Wang, J. I. Laughner, I. R. Efimov, and S. Zhang, "3D absolute shape measurement of live rabbit hearts with a superfast two-frequency phase-shifting technique," Optics express 21, 5822-5832 (2013).
20. C. Zuo, T. Tao, S. Feng, L. Huang, A. Asundi, and Q. Chen, "Micro Fourier Transform Profilometry (pFTP): 3D shape measurement at 10,000 frames per second," Optics and Lasers in Engineering 102, 70-91 (2018).
21. Y. Wang and S. Zhang, "Three-dimensional shape measurement with binary dithered patterns," Applied optics 51, 6631-6636 (2012).
22. J.-S. Hyun, B. Li, and S. Zhang, "High-speed high-accuracy three-dimensional shape measurement using digital binary defocusing method versus sinusoidal method," Optical Engineering 56, 074102 (2017).
23. B. Li, Y. Wang, J. Dai, W. Lohry, and S. Zhang, "Some recent advances on superfast 3D shape measurement with digital binary defocusing techniques," Optics and Lasers in Engineering 54, 236-246 (2014).
24. S. Lei and S. Zhang, "Flexible 3-D shape measurement using projector defocusing," Optics letters 34, 3080-3082 (2009).
25. J. Liang, R. N. Kohn Jr, M. F. Becker, and D. J. Heinzen, "High-precision laser beam shaping using a binary-amplitude spatial light modulator," Appl. Opt. 49, 1323-1330 (2010).
26. T. D. Han and T. S. Abdelrahman, "hiCUDA: High-level GPGPU programming," IEEE Transactions on Parallel and Distributed systems 22, 78-90 (2010).
27. K. L. Chung, S. C. Pei, Y. L. Pan, W. L. Hsu, Y. H. Huang, W. N. Yang, and C. H. Chen, "A gradient-based adaptive error diffusion method with edge enhancement," Expert Systems with Applications 38, 1591-1601 (2011).
28. D. C. Ghiglia and L. A. Romero, "Robust two-dimensional weighted and unweighted phase unwrapping that uses fast transforms and iterative methods," JOSA A 11, 107-117 (1994).
29. D. C. Ghiglia and M. D. Pritt, Two-dimensional phase unwrapping: theory, algorithms, and software (Wiley New York, 1998), Vol. 4, p. 512.
30. https://developernvidia.com/cufft.
31. W.-X. Huang and H. J. Sung, "Three-dimensional simulation of a flapping flag in a uniform flow," Journal of Fluid Mechanics 653, 301-336 (2010).
32. D. Waide, "The Future of Machine Vision Standards," Quality, 19VS (2017).
33. J.-S. Hyun and S. Zhang, "Enhanced two-frequency phase-shifting method," Applied optics 55, 4395-4401 (2016).
34. K. Zhong, Z. Li, X. Zhou, Y. Li, Y. Shi, and C. Wang, "Enhanced phase measurement profilometry for industrial 3D inspection automation," The International Journal of Advanced Manufacturing Technology 76, 1563-1574 (2015).
35. A. Chatterjee, P. Singh, V. Bhatia, and S. Prakash, "Ear biometrics recognition using laser biospeckled fringe projection profilometry," Optics & Laser Technology 112, 368-378 (2019).
36. M. Akutsu, Y. Oikawa, and Y. Yamasaki, "Extract voice information using high-speed camera," in Proceedings of Meetings on Acoustics ICA2013, (ASA, 2013), 055019.
37. S. Banerjee, B. S. Connell, and D. K. Yue, "Three-dimensional effects on flag flapping dynamics," Journal of Fluid Mechanics 783, 103-136 (2015).
38. M. J. Shelley and J. Zhang, "Flapping and bending bodies interacting with fluid flows," Annual Review of Fluid Mechanics 43, 449-465 (2011).
39. Y. Watanabe, K. Isogai, S. Suzuki, and M. Sugihara, "A theoretical study of paper flutter," Journal of Fluids and Structures 16, 543-560 (2002).
40. G. W. Taylor, J. R. Burns, S. Kammann, W. B. Powers, and T. R. Welsh, "The energy harvesting eel: a small subsurface ocean/river power generator," IEEE journal of oceanic engineering 26, 539-547 (2001).
41. B. S. Connell and D. K. Yue, "Flapping dynamics of a flag in a uniform stream," Journal of fluid mechanics 581, 33-67 (2007).
42. S. Michelin, S. G. L. Smith, and B. J. Glover, "Vortex shedding model of a flapping flag," Journal of Fluid Mechanics 617, 1-10 (2008).

43. S. Alben and M. J. Shelley, "Flapping states of a flag in an inviscid fluid: bistability and the transition to chaos," Physical review letters 100, 074301 (2008).
44. J. Zhang, S. Childress, A. Libchaber, and M. Shelley, "Flexible filaments in a flowing soap film as a model for one-dimensional flags in a two-dimensional wind," Nature 408, 835 (2000).
45. M. Shelley, N. Vandenberghe, and J. Zhang, "Heavy flags undergo spontaneous oscillations in flowing water," Physical review letters 94, 094302 (2005).
46. M. Argentina and L. Mahadevan, "Fluid-flow-induced flutter of a flag," Proceedings of the National Academy of Sciences 102, 1829-1834 (2005).
47. A. Manela and M. Howe, "On the stability and sound of an unforced flag," Journal of Sound and Vibration 321, 994-1006 (2009).
48. T. S. Shores, Applied linear algebra and matrix analysis (Springer, 2007), Vol. 2541.
49. J.-Y. Bouguet, "Camera Calibration Toolbox for Matlab", retrieved http://www.vision.caltech.edu/bouguetj/calib_doc/.
50. S. Zhang and P. S. Huang, "Novel method for structured light system calibration," Optical Engineering 45, 083601 (2006).

The invention claimed is:

1. A method for high-speed three-dimensional surface imaging of an object using band-limited illumination, comprising using one binary digital micromirror device pattern and a 4f imaging system to produce a greyscale sinusoidal pattern from an input laser beam, the grayscale sinusoidal pattern being processed by an adaptive error diffusion algorithm into a corresponding binary pattern able to be displayed on the digital micromirror device at the digital micromirror device's refreshing rate, to an image plane of a 4f imaging system, using an optical amplitude/intensity filter pinhole positioned at the 4f imaging system's Fourier plane; projecting each binary pattern displayed on the digital micromirror device onto the object; acquiring a resulting sinusoidal pattern as deformed by a geometry of the three-dimensional surface of the object using a camera and high-speed image data streaming from the camera to a graphic processing unit for parallel computation of image classification and phase extraction to reconstruct the three-dimensional surface of the object from the sinusoidal pattern deformed by the geometry of the three-dimensional surface of the object acquired by the camera; displaying the three-dimensional surface of the object as thus reconstructed.

2. The method of claim 1, wherein said projecting each binary pattern displayed on the digital micromirror device onto the object comprises using a projector lens to project an image formed at the image plane of the 4f imaging system.

3. The method of claim 1, wherein the camera is a high speed camera in a CoaXPress-interface with a computer.

4. The method of claim 1, wherein the camera is a high speed camera and the camera is interfaced with the graphic processing unit with a CXP cable.

5. The method of claim 1, comprising using a continuous-wave laser with an output power of at least 200 mW and a wavelength selected in a range between 420 and 700 nm as a source of the input laser beam.

6. The method of claim 1, wherein the digital micromirror device has a resolution of more than 1 Mega pixels and a full frame refreshing rate of at least 5 kHz.

7. The method of claim 1, wherein the digital micromirror device has a resolution of more than 1 Mega pixels and a full frame refreshing rate of at least 5 kHz, the method comprising expanding the input laser beam in relation to an active area of the digital micromirror device.

8. The method of claim 1, wherein the digital micromirror device has a resolution of more than 1 Mega pixels and a full frame refreshing rate of at least 5 kHz, the method comprising expanding the input laser beam in relation to an active area of the digital micromirror device using a beam expander having magnification times of more than 8, a maximum input beam diameter of more than 1.2 mm, and a wavelength range selected in a range between 420 and 700 nm.

9. The method of claim 1, wherein the camera is a high speed camera of a frame rate of at least 5 k frames/second, and a sensor with more than 250 k pixels.

10. The method of claim 1, using a CoaXPress interface having a data transfer speed of at least 25 Gbps to interface the camera with the graphic processing unit, the camera being a high-speed camera and the graphic processing unit having a memory speed of a least 8 Gbps, a memory bandwidth of a least 192 GB/sec, and NVIDIA CUDA® Cores of a least 1152.

11. A system high-speed 3D surface imaging of an object using band-limited illumination, comprising:
a laser source;
a digital micromirror device;
a 4f imaging system and an optical amplitude/intensity filter pinhole positioned at a Fourier plane of the 4f imaging system;
a projector;
a graphic processing unit; and
a display unit;
wherein an input laser beam from said laser source is used to produce a greyscale sinusoidal pattern, and the grayscale sinusoidal pattern is processed using the graphic processing unit in combination with an adaptive error diffusion algorithm into a corresponding binary pattern able to be displayed on the digital micromirror device;
wherein the 4f imaging system and the optical amplitude/intensity filter pinhole filter high-spatial frequency noise; said projector projecting the binary pattern displayed on the digital micromirror device onto the object; said camera acquiring a resulting sinusoidal pattern as deformed by a geometry of the 3D surface of the object and data streaming to the graphic processing unit for parallel computation of image classification and phase extraction to reconstruct the 3D surface of the object from the sinusoidal pattern as deformed by the geometry of the 3D surface of the object acquired by the camera; said display unit displaying the 3D surface of the object as thus reconstructed.

12. The system of claim 11, wherein said projector projects an image formed at the image plane of the 4f imaging system.

13. The system of claim 11, wherein said laser source is a continuous-wave laser with an output power of at least 200 mW and a wavelength selected in a range between 420 and 700 nm.

14. The system of claim 11, wherein the digital micromirror device has a resolution of more than 1 Mega pixels and a full frame refreshing rate of at least 5 kHz.

15. The system of claim 11, wherein the camera is a high speed camera of a frame rate of at least 5 k frames/second, and a sensor with more than 250 k pixels.

16. The system of claim 11, comprising a beam expander selected with a magnification time of more than 8, a maximum input beam diameter of more than 1.2 mm, and a wavelength range selected in a range between 420 and 700 nm, said beam expander expanding the input laser beam in relation to an active area of the digital micromirror device.

17. The system of claim 11, comprising a CoaXPress interface having a data transfer speed of at least 25 Gbps interfacing the camera with the graphic processing unit, said graphic processing unit having a memory speed of a least 8 Gbps, a memory bandwidth of a least 192 GB/sec, and NVIDIA CODA® Cores.

\* \* \* \* \*